(12) United States Patent
Itoigawa et al.

(10) Patent No.: US 9,025,701 B2
(45) Date of Patent: May 5, 2015

(54) RECEIVER AND TRANSMISSION AND RECEPTION SYSTEM

(71) Applicant: Renesas SP Drivers Inc., Tokyo (JP)

(72) Inventors: Keiichi Itoigawa, Tokyo (JP); Shinichi Ogou, Tokyo (JP); Jun Kurosawa, Tokyo (JP); Takashi Tamura, Tokyo (JP)

(73) Assignee: Renesas SP Drivers Inc., Tokyo (JP)

(*) Notice: Subject to any disclaimer, the term of this patent is extended or adjusted under 35 U.S.C. 154(b) by 0 days.

(21) Appl. No.: 14/183,462

(22) Filed: Feb. 18, 2014

(65) Prior Publication Data

US 2014/0241465 A1 Aug. 28, 2014

(30) Foreign Application Priority Data

Feb. 28, 2013 (JP) ................. 2013-039802

(51) Int. Cl.
| | |
|---|---|
| *H03K 9/00* | (2006.01) |
| *H04L 25/02* | (2006.01) |
| *H04L 25/14* | (2006.01) |
| *H04L 7/00* | (2006.01) |
| *H04L 7/033* | (2006.01) |
| *H04L 7/04* | (2006.01) |

(52) U.S. Cl.
CPC ............ *H04L 25/0272* (2013.01); *H04L 25/14* (2013.01); *H04L 7/0041* (2013.01); *H04L 7/0008* (2013.01); *H04L 7/0338* (2013.01); *H04L 7/04* (2013.01); *H04L 7/0037* (2013.01)

(58) Field of Classification Search
USPC ......... 375/219, 257, 316, 340, 346, 348, 371, 375/373, 376; 327/141, 144, 152–153, 261, 327/269–270, 284
See application file for complete search history.

(56) References Cited

U.S. PATENT DOCUMENTS

| | | | |
|---|---|---|---|
| 6,247,138 B1 * | 6/2001 | Tamura et al. ................. | 713/600 |
| 2002/0009169 A1 * | 1/2002 | Watanabe ...................... | 375/371 |
| 2002/0179938 A1 * | 12/2002 | Dorschky et al. ............. | 257/200 |
| 2003/0043615 A1 * | 3/2003 | Lin ................................ | 365/141 |
| 2003/0043926 A1 * | 3/2003 | Terashima et al. ............ | 375/257 |
| 2004/0068682 A1 * | 4/2004 | Takei et al. ................... | 714/700 |
| 2004/0223566 A1 | 11/2004 | Yamashita | |
| 2005/0001655 A1 * | 1/2005 | Takeda .............................. | 327/2 |
| 2006/0018407 A1 * | 1/2006 | Osaka et al. ................... | 375/316 |

(Continued)

FOREIGN PATENT DOCUMENTS

| | | |
|---|---|---|
| JP | H05-110550 A | 4/1993 |
| JP | H10-164037 A | 6/1998 |
| JP | 2004-236019 A | 8/2004 |

*Primary Examiner* — Khanh C Tran
(74) *Attorney, Agent, or Firm* — McGinn IP Law Group, PLLC

(57) ABSTRACT

A receiver is composed of a receiver-side amplifier which receives a clock signal, a receiver-side amplifier which receives a data signal, a variable delay circuit which generates a delay-adjusted clock signal and a delay-adjusted data signal by delaying the clock signal and the data signal, a latch circuit section which latches the delay-adjusted data signal in synchronous with the delay-adjusted clock signal, and a skew detecting circuit which generates skew detection data that by latching a specific data sequence transmitted as the data signal in synchronous with a first clock signal to $N^{th}$ clock signal (N is an integer equal to or more than 2) with different delay times from the clock signal. The delay time in the variable delay circuit is controlled according to the skew detection data.

17 Claims, 29 Drawing Sheets

(56) References Cited

U.S. PATENT DOCUMENTS

| | | | |
|---|---|---|---|
| 2007/0050658 A1* | 3/2007 | Kuwata | 713/503 |
| 2009/0247068 A1* | 10/2009 | Toyoda | 455/8 |
| 2010/0272215 A1* | 10/2010 | Lin et al. | 375/316 |
| 2011/0291719 A1* | 12/2011 | Ok | 327/158 |

* cited by examiner

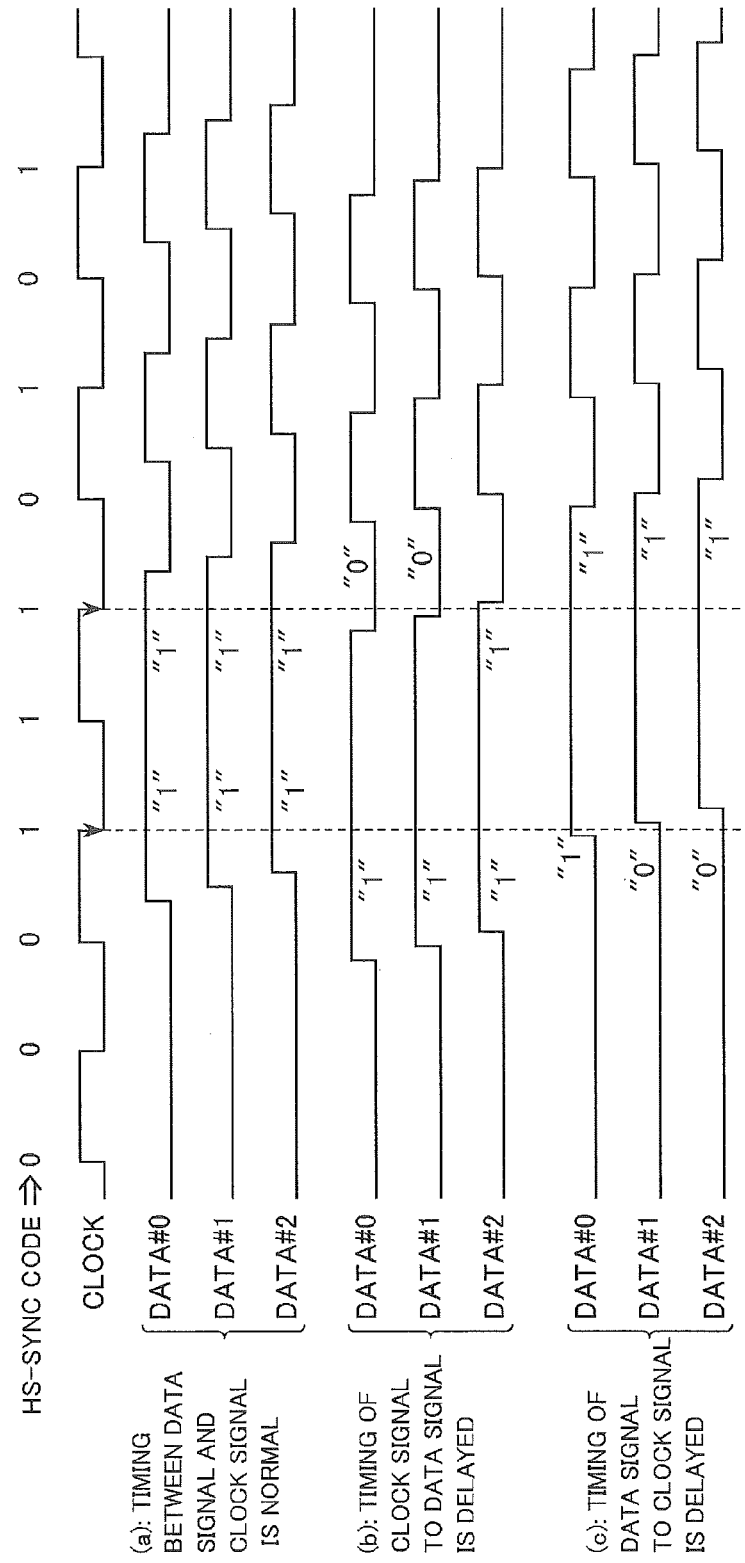

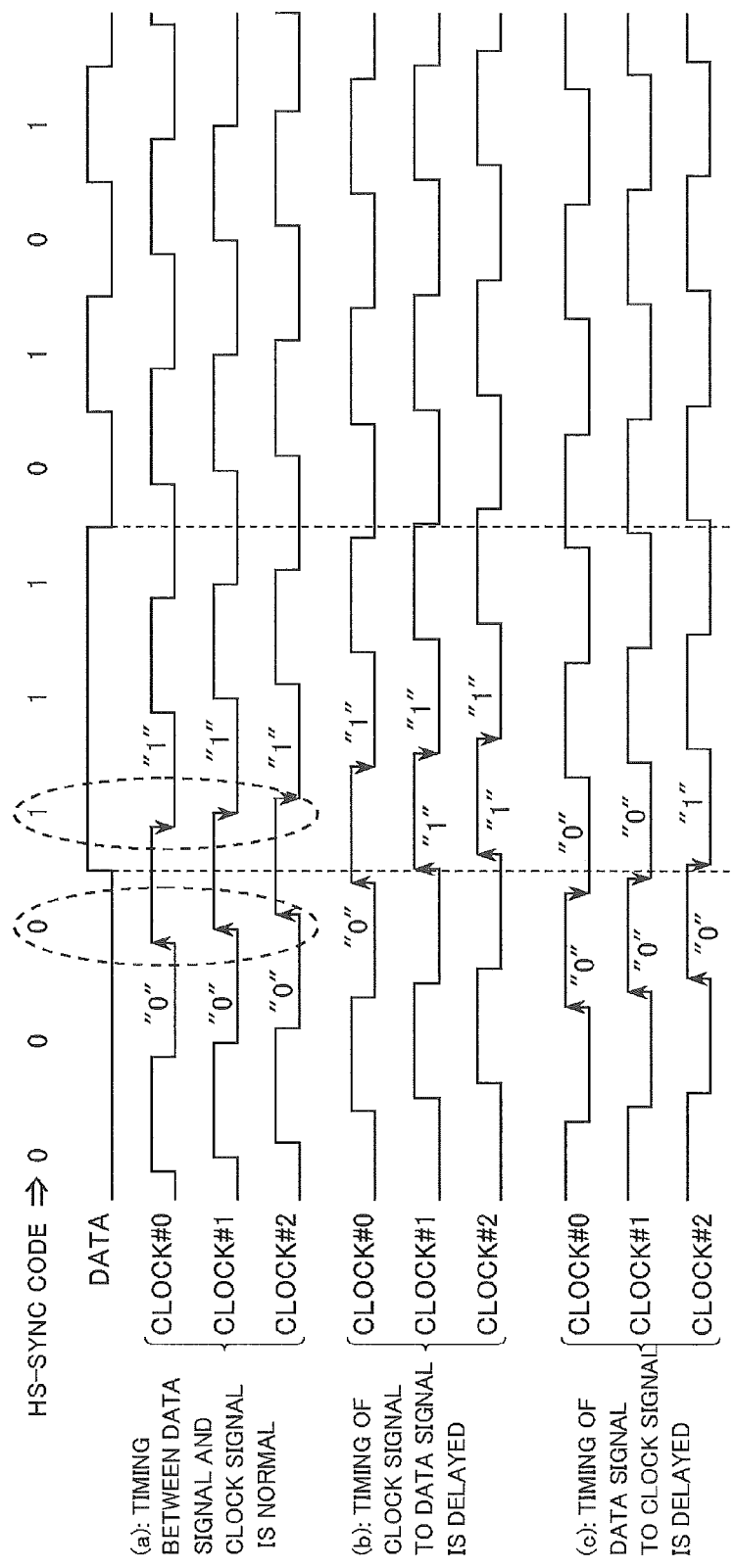

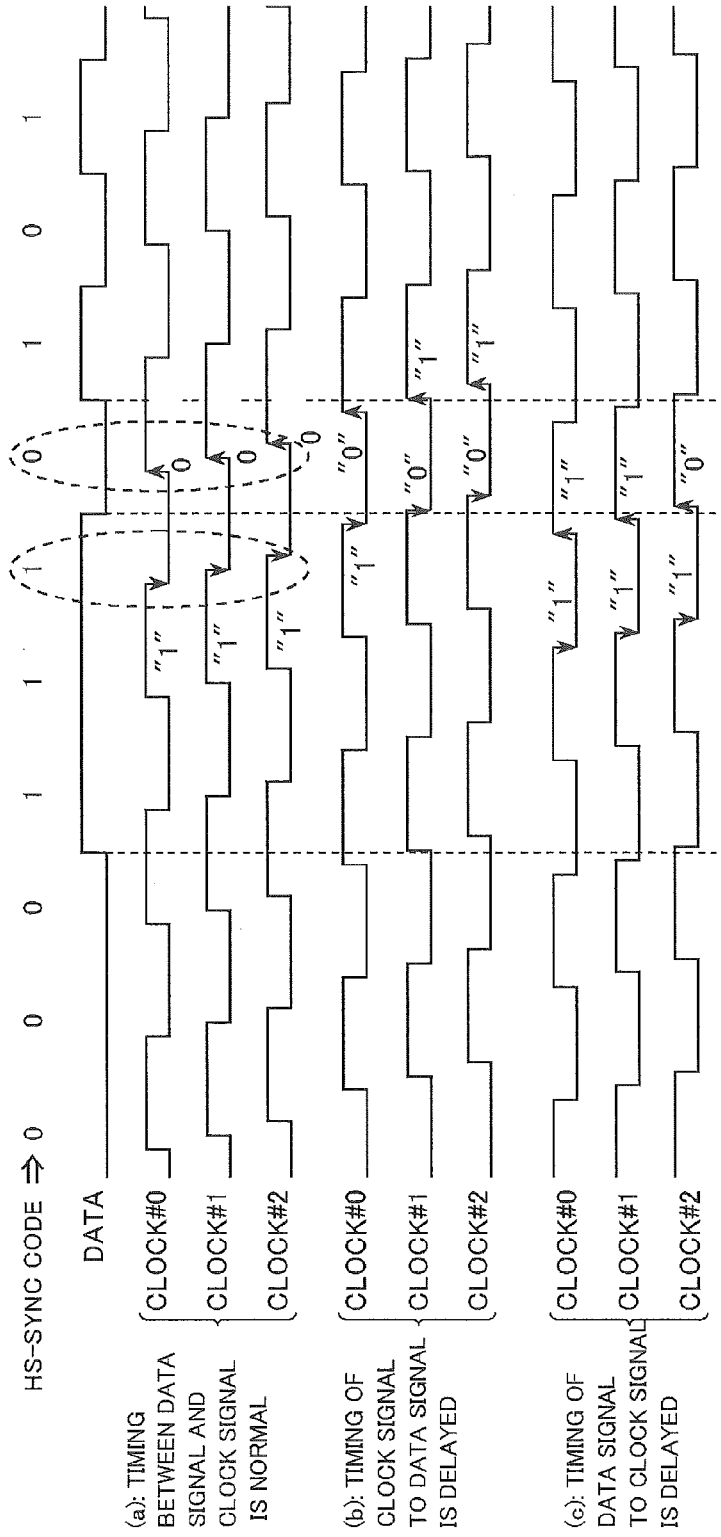

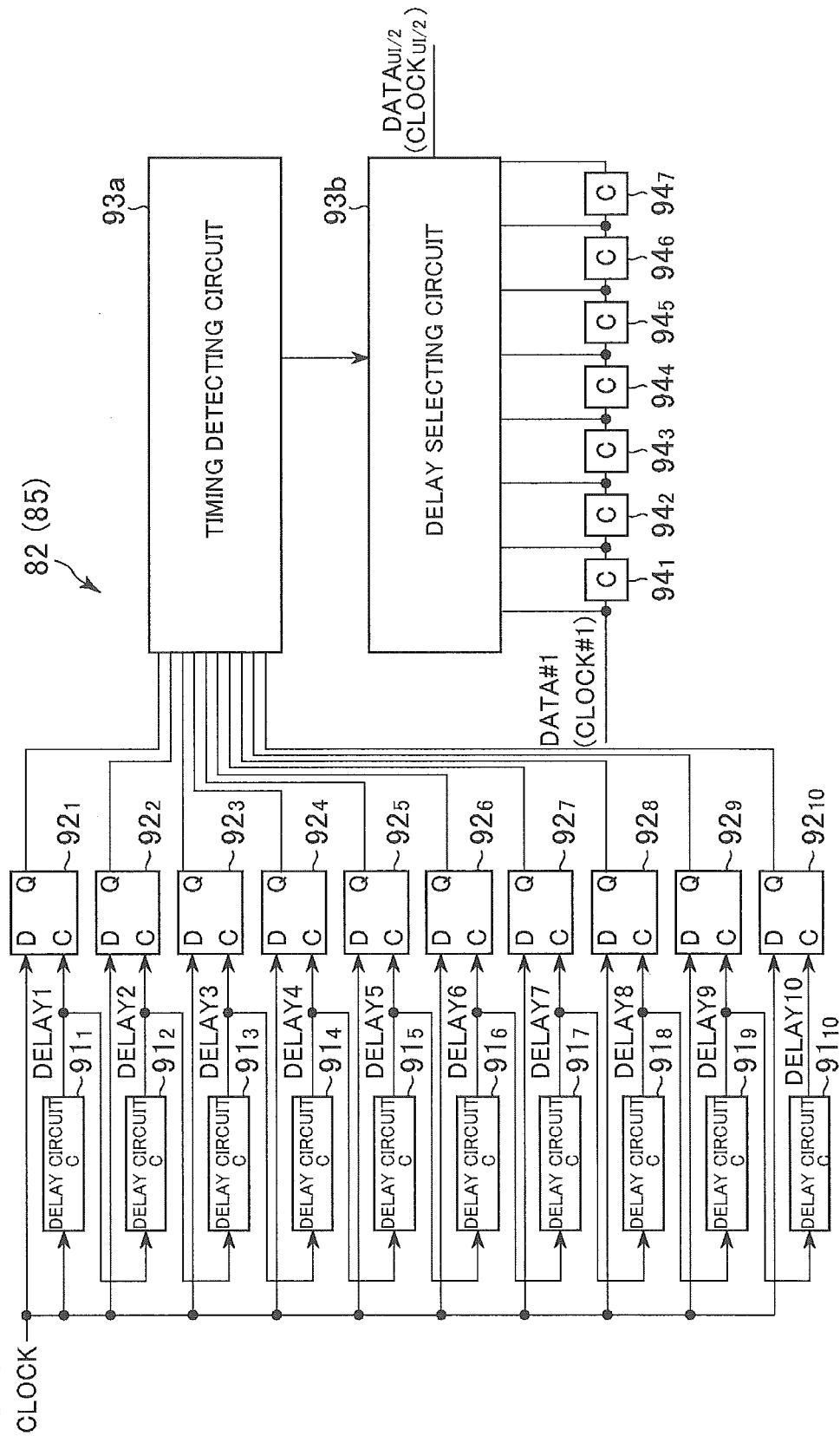

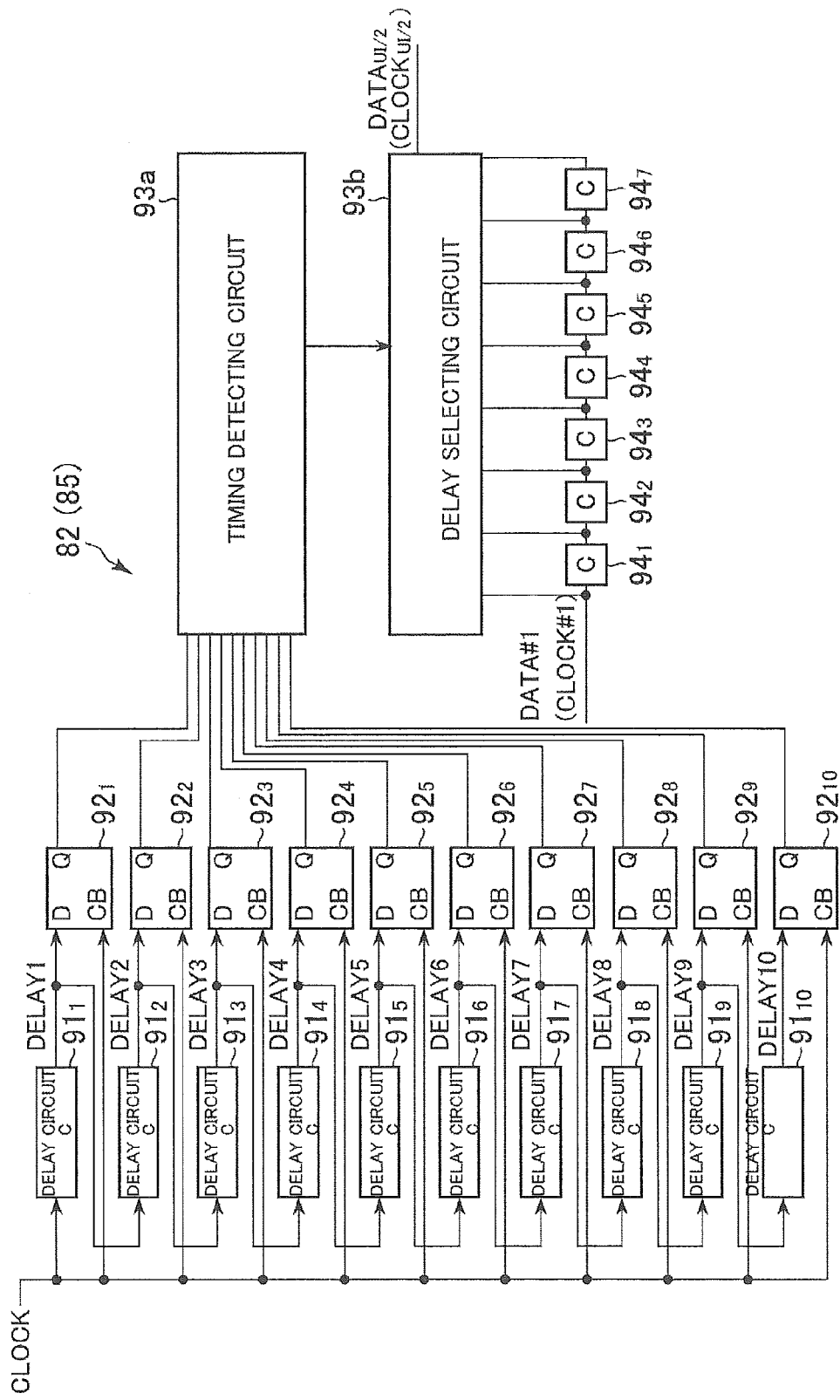

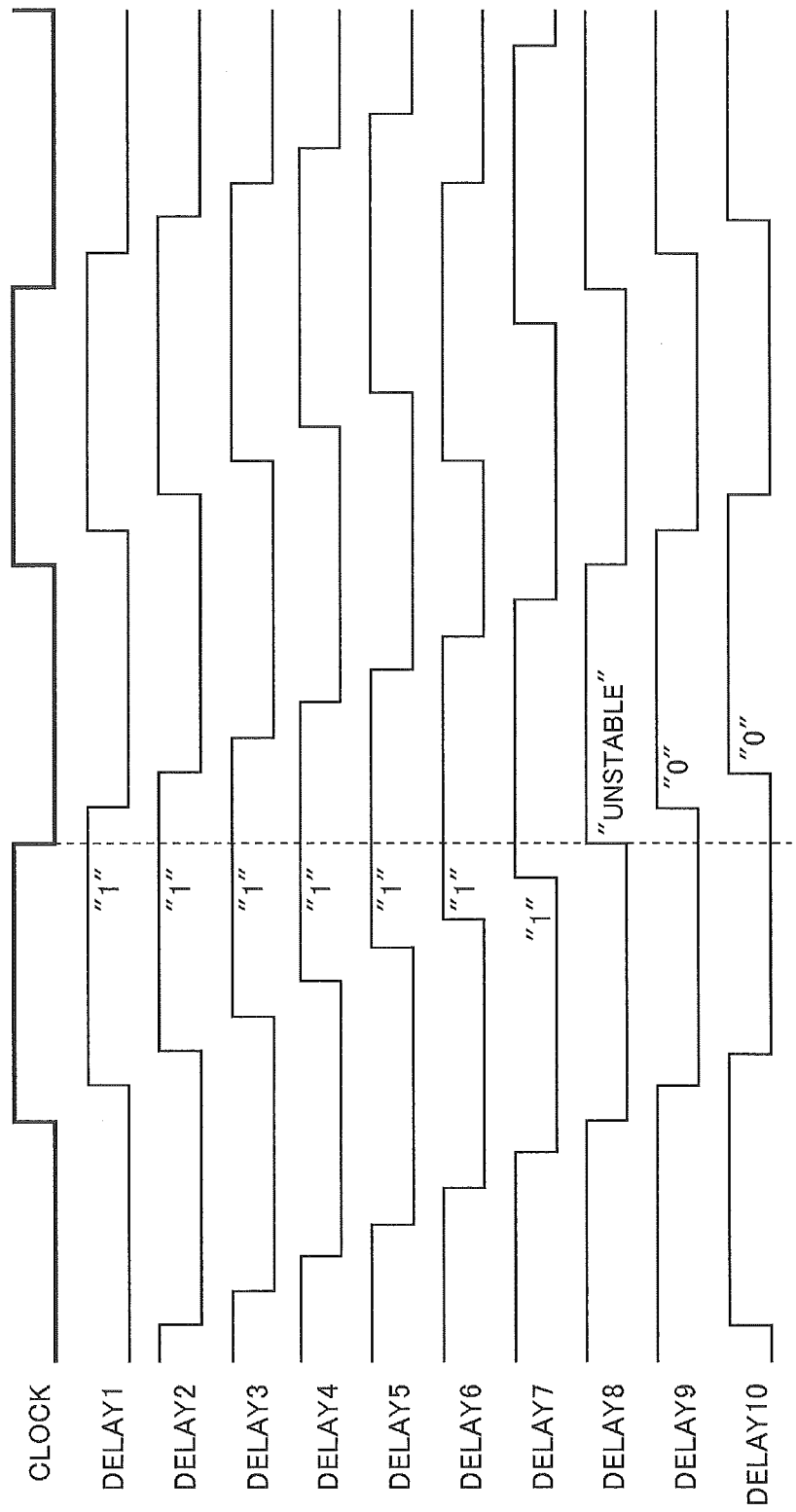

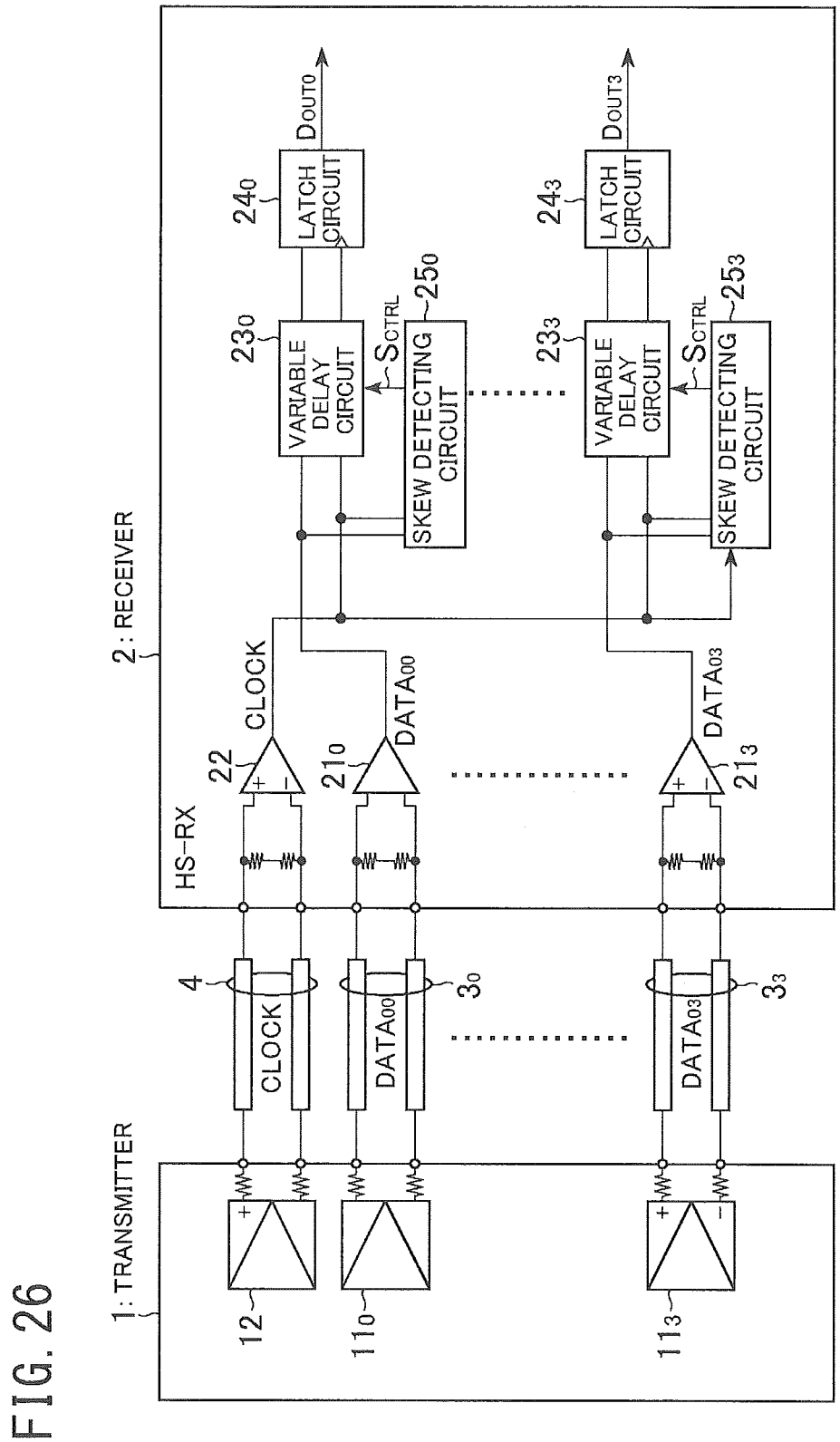

RECEIVER AND TRANSMISSION AND RECEPTION SYSTEM

CROSS-REFERENCE

This application claims a priority on convention based on Japanese Patent Application JP 2013-039802. The disclosure thereof is incorporated herein by reference.

TECHNICAL FIELD

The present invention is related to a receiver and a transmission and reception system, especially to a transmission and reception system which transmits a clock signal and a data signal by different lines and a receiver used in it.

BACKGROUND ART

One of data communication methods which are used in a transmission and reception system which transmits data from a transmitter to a receiver is a method which transmits a clock signal and a data signal by different lines. For example, the communication (e.g. MIPI DSI and MIPI D-PHY) of MIPI standard (Mobile Industry Processor Interface) conforms to such a data communication method. For example, MIPI D-PHY is used for the high-speed data communication to a driver IC of a panel display unit, and with development of the display panel to a high resolution panel in recent years, further speeding-up is required in the data communication of MIPI-D-PHY.

One problem when communication speed is to be increased in the data communication method which transmits the clock signal and the data signal with different lines is in that a skew occurs between the clock signal and the data signal. In case of high-speed communication, the problem of the skew can become a very important problem. For example, a permission range of the skew in communication of the speed of 1.5 Gbps in the transmission and reception system based on the MIPI D-PHY standard is very small with tens to hundreds of ps.

For example, a technique to cancel the skew is known in the Japanese Patent Publications (JP H05-110550A, JP H10-164037A and JP 2004-236019A). However, according to the study of the inventors, there is a room of the improvement in these techniques to cancel the skew.

CITATION LIST

[Patent Literature 1] JP H05-110550A
[Patent Literature 2] JP H10-164037A
[Patent literature 3] JP 2004-236019A

SUMMARY OF THE INVENTION

Therefore, one object of the present invention is to provide a technique to cancel a skew in the transmission and reception system which transmits the clock signal and the data signal with different lines.

According to an aspect of the present invention, in a receiver, a first receiving section is configured to receive an external clock signal and output a clock signal, and a second receiving section is configured to receive an external data signal and output a data signal. A variable delay circuit is configured to generate a delay-adjusted clock signal and a delay-adjusted data signal by delaying at least one of the clock signal and the data signal, and a latch circuit section is configured to latch the delay-adjusted data signal in synchronization with the delay-adjusted clock signal to output an output data signal. A skew detecting circuit is configured to latch a specific data sequence transmitted as the data signal or the delayed data signal obtained by delaying the data signal, in synchronization with first to $N^{th}$ clock signals (N is an integer equal to or more than 2) with different delay times to the clock signal to generate skew detection data, and control the variable delay circuit to adjust a delay time of the at least one signal based on the skew detection data.

According to another aspect of of the present invention, in a receiver, a first receiving section is configured to receive an external clock signal and output a clock signal, and a second receiving section is configured to receive an external data signal and output a data signal. A variable delay circuit is configured to generate a delay-adjusted clock signal and a delay-adjusted data signal by delaying at least one of the clock signal and the data signal, and a latch circuit section configured to latch the delay-adjusted data signal in synchronization with the delay-adjusted clock signal to generate an output data signal. A skew detecting circuit is configured to generate skew detection data by latching a specific data sequence transmitted with first to $N^{th}$ data signals (N is an integer equal to or more than 2) with different delay times to the data signal in synchronization with the clock signal or a delayed clock signal obtained by delaying the clock signal, and control a delay time of the at least one signal based on the skew detection data.

According to a further another aspect of the present invention, a transmission and reception system includes a transmitter and a receiver configured to receive an external clock signal and an external data signal from the transmitter. The receiver has the above-mentioned configuration. According to an embodiment, the transmission of the external clock signal and the external data signal from the transmitter to the receiver is carried out based on the MIPI D-PHY standard, and the specific data sequence is a data sequence which is contained in the HY-SYNC code.

The technique to cancel a skew in the transmission and reception system which transmits the clock signal and the data signal with different lines according to the present invention is provided.

BRIEF DESCRIPTION OF THE DRAWINGS

FIG. 5 is a timing chart showing another modification example of the operation of the transmission and reception system in the embodiment;

FIG. 6A is a timing chart showing another modification example of the operation of the transmission and reception system in the embodiment;

FIG. 6B is a timing chart showing another modification example of the operation of the transmission and reception system of the embodiment;

FIG. 21A is a block diagram showing the configuration of the delay circuit to control the delay time to UI/2 in the exemplary embodiment 7;

FIG. 21B is a block diagram showing another configuration of the delay circuit to control the delay time to UI/2 in the exemplary embodiment 7;

FIG. 22B is a timing chart showing the operation of the delay circuit of FIG. 21B;

FIG. 26 is a block diagram showing the configuration of the transmission and reception system in the exemplary embodiment 9.

DESCRIPTION OF EMBODIMENTS

Figure 1:
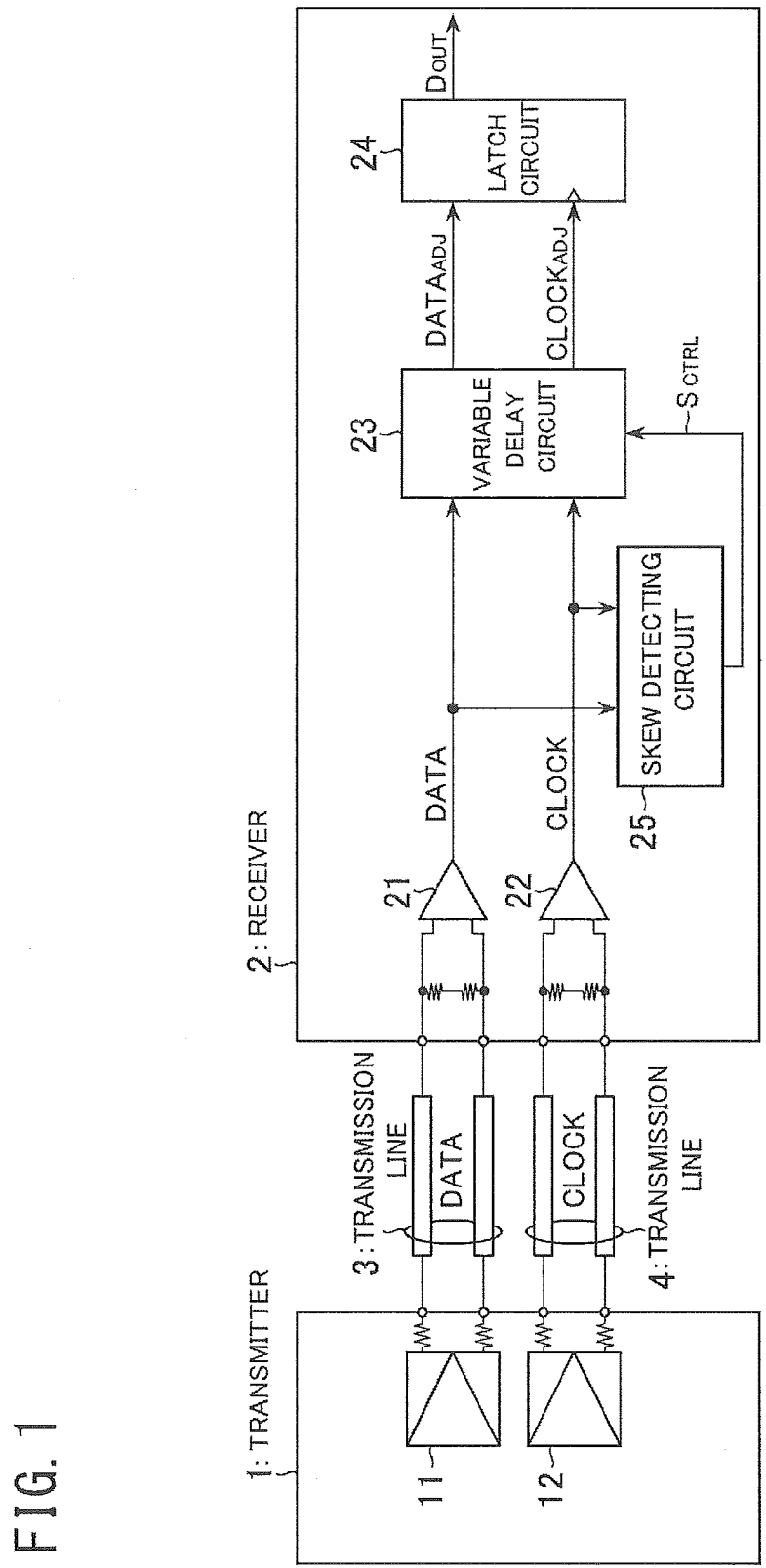
FIG. 1 is a block diagram showing a configuration of a transmission and reception system according to an embodiment of the present invention.

FIG. 1 is a block diagram showing a configuration of a transmission and reception system according to one embodiment. The transmission and reception system is composed of a transmitter (transmission device) 1 and a receiver (reception device) 2. The transmitter 1 and the receiver 2 are connected through transmission lines 3 and 4. The transmitter 1 transmits a data signal DATA and a clock signal CLOCK to the receiver 2 through the transmission lines 3 and 4, respectively. In the present embodiment, the transmission of the data signal DATA and the clock signal CLOCK from the transmitter 1 to the receiver 2 is based on the MIPI D-PHY standard.

The transmitter 1 is composed of transmission-side amplifiers 11 and 12 and the receiver 2 is composed of receiver-side amplifiers 21 and 22. As the transmission-side amplifiers 11 and 12, high speed amplifiers are used for both. The transmission-side amplifier 11 of the transmitter 1 functions as a first transmitting section which transmits the data signal DATA to the receiver 2 through the transmission line 3. The transmission-side amplifier 12 of the transmitter 1 functions as a second transmitting section which transmits the clock signal CLOCK to the receiver-side amplifier 22 of the receiver 2 through the transmission line 4. In the transmission lines 3 and 4, each of the data signal DATA and the clock signal CLOCK is transmitted as a differential small amplitude signal.

The receiver 2 functions as a receiving section in which the receiver-side amplifiers 21 and 22 receive the data signal DATA (external data signal) and the clock signal CLOCK (external clock signal) transmitted from the transmitter 1 as differential small amplitude signals, and convert the data signal DATA and the clock signal CLOCK into single end signals. That is, the data signal DATA and the clock signal CLOCK which are outputted from the receiver-side amplifiers 21 and 22 are single end signals. As the receiver-side amplifiers 21 and 22, high speed amplifiers are used for both. The data signal DATA which is outputted from the receiver-side amplifier 21 of the receiver 2 is a signal to transmit 1-bit data in a half period of the clock signal CLOCK. That is, the data signal DATA contains 1-bit data per each edge (containing both of a rising edge and a falling edge) of the clock signal CLOCK.

Moreover, the receiver 2 is further composed of a variable delay circuit 23, a latch circuit 24 and a skew detecting circuit 25. The variable delay circuit 23 is configured to control or adjust a relative delay between the data signal DATA and the clock signal CLOCK which are outputted from the receiver-side amplifiers 21 and 22 and has a function of delaying one of these signals to the other signal by a specific delay time. Here, the delay time is controlled or adjusted in response to a delay control signal $S_{CTRL}$ which is supplied from the skew detecting circuit 25. The data signal DATA and the clock signal CLOCK having delays adjusted by the variable delay circuit 23 in FIG. 1 are shown as a data signal $DATA_{ADJ}$ and a clock signal $CLOCK_{ADJ}$.

The latch circuit 24 latches the data signal $DATA_{ADJ}$ after the delay adjustment in synchronization with the clock signal $CLOCK_{ADJ}$ after the delay adjustment and generates an output data signal $D_{OUT}$. In the present embodiment, the latch circuit 24 latches the data signal $DATA_{ADJ}$ after the delay adjustment in response to each of the rising edge and falling edge of the clock signal $CLOCK_{ADJ}$ after the delay adjustment.

The skew detecting circuit 25 detects a skew between the data signal DATA and the clock signal CLOCK and generates a delay control signal $S_{CTRL}$ according to the detected skew. The generated delay control signal $S_{CTRL}$ is sent to the variable delay circuit 23. In the variable delay circuit 23, a relative delay between the data signal DATA and the clock signal CLOCK is controlled or adjusted in response to the delay control signal $S_{CTRL}$ generated according to the skew.

In the present embodiment, the skew detection by the skew detecting circuit 25 is carried out under the presupposition that it is known that a specific data sequence is sent to the receiver 2 at a specific timing by use of the data signal DATA.

Then, in the skew detecting circuit 25, a skew is detected by using a data group (hereinafter, to be referred to as "skew detection data") which is obtained by latching the specific data sequence in synchronization with a multi-phase clock signal generated from the clock signal CLOCK.

Figure 2:
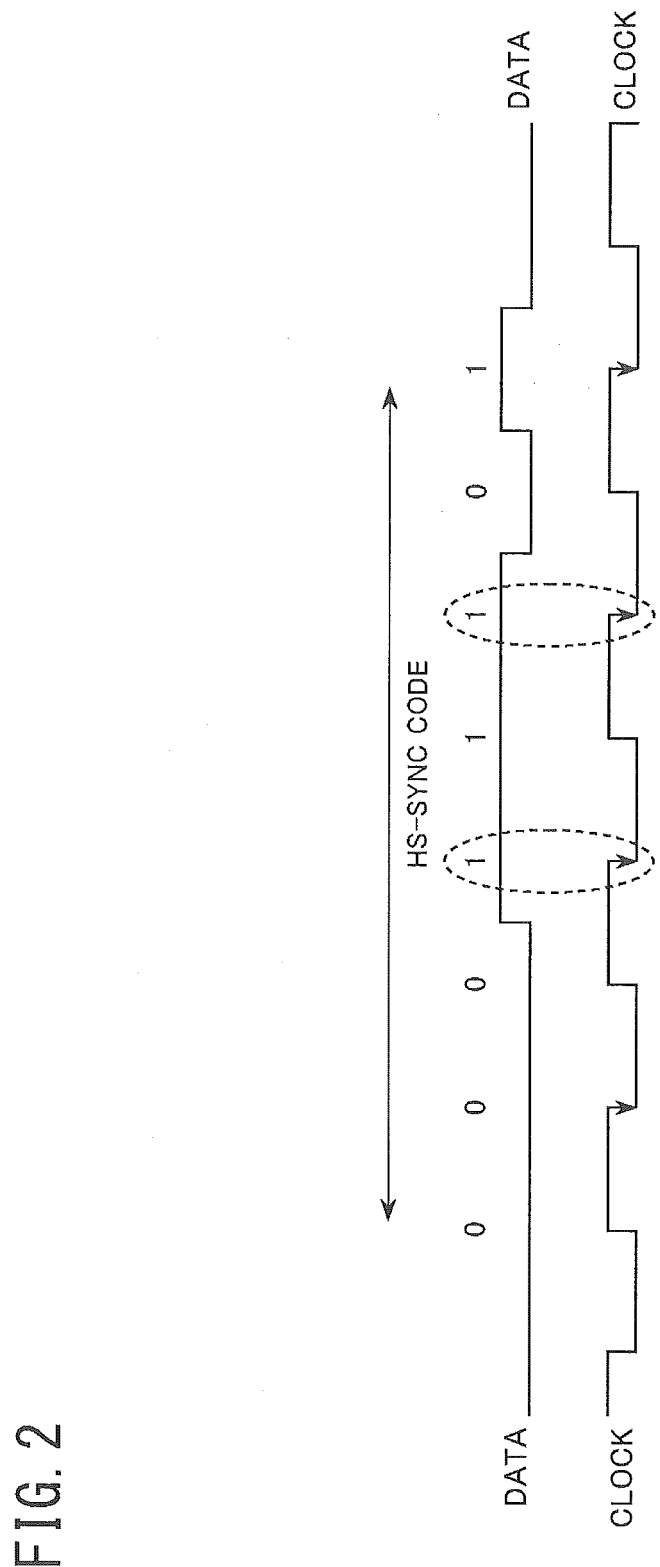
FIG. 2 is a diagram showing HS-SYNC code.

In the present embodiment in which a data communication from the transmitter 1 to the receiver 2 is carried out based on the MIPI D-PHY standard, the skew detection data is generated by latching the specific data sequence contained in HS-SYNC code in synchronization with the multi-phase clock signal. FIG. 2 is a diagram showing HS-SYNC code. The HS-SYNC code is a serial code of 8 bits, and the value has been determined as "00011101" in the MIPI D-PHY standard. The HS-SYNC code is prescribed as a rule that it is inserted in the head of the data sequence sent with the data signal DATA when the data communication from the transmitter 1 to the receiver 2 is changed from an LP (low power) mode to an HS (high speed) mode in the MIPI D-PHY standard. This means that the timing when HS-SYNC code is sent has been known to the receiver 2.

The data sequence of "01110" exists in the HS-SYNC code. In the present embodiment, the first of "1" and the third of "1" in the data sequence (shown by broken line ellipses in FIG. 2) are used for the skew detection data. In the present embodiment in which the transmission of data of one bit per half period of the clock signal CLOCK is carried out, if the timing between the data signal DATA and the clock signal CLOCK is normal, both of the first of "1" and the third of "1" in the data sequence of "01110" must be latched in synchronization with the rising edge or falling edge of the clock signal CLOCK. When any skew between the data signal DATA and the clock signal CLOCK does not exist at all, the first of "1" and the third of "1" in the data sequence of "01110" could be latched correctly even if the data sequence of "01110" is latched in synchronization with the falling edge or rising edge of a clock signal slightly different in phase from the clock signal CLOCK. On the other hand, in case where a skew exists between the data signal DATA and the clock signal CLOCK, when the data sequence of "01110" is latched in synchronization with the falling edge or rising edge of a clock signal slightly different in phase from the clock signal CLOCK, the first of "1" or the third of "1" cannot be latched correctly, resulting in that data of "0" is latched. This means that the skew can be detected by referring to the skew detection data, i.e. the data obtained by latching the data sequence of "01110" in synchronization with the falling edges or the rising edges of the multi-phase clock signal generated from the clock signal CLOCK. Here, the multi-phase clock signal which is used to obtain the skew detection data has been generated to have a frequency identical with that of the clock signal CLOCK and have phases different from each other.

Figure 3:
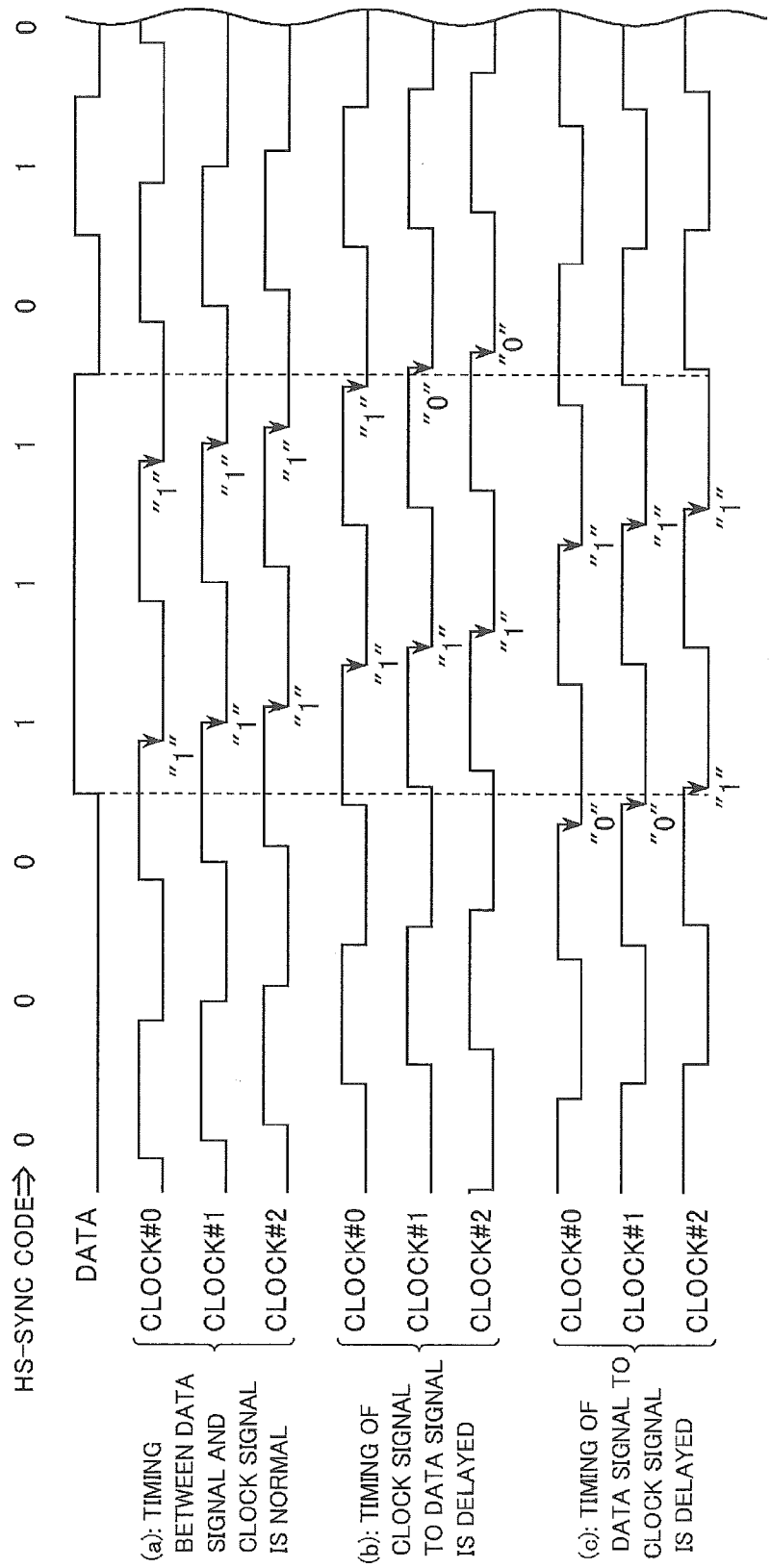
FIG. 3 is a timing chart showing the operation of the transmission and reception system in the embodiment.

FIG. 3 shows an operation of the transmission and reception system, in the present embodiment, and especially, shows the skew detection data obtained by latching the data sequence of "01110", which is contained in the HS-SYNC code, in synchronization with the falling edges of the clock signals CLOCK#0 to CLOCK#2 of the multi-phase clock signal generated from the clock signal CLOCK. Each of the clock signals CLOCK#0 to CLOCK#2 of the multi-phase clock signal contains two falling edges in a time zone when data sequence of "01110" is transferred by use of the data signal DATA. In the following description, the falling edge on a front side of the two falling edges is referred to as a "front-side falling edge", and the falling edge on a rear side thereof is referred to as a "rear-side falling edge".

As an example, as shown in (a) of FIG. 3, when the timing between the data signal DATA and the clock signal CLOCK is normal, the first of "1" of the data sequence of "01110" is latched in synchronization with the front-side falling edges of the clock signals CLOCK#0 to CLOCK#2 of the multi-phase clock signal, and the third of "1" is latched in synchronization with the rear-side falling edges of the clock signals CLOCK#0 to CLOCK#2. As a result, all the values of the skew detection data are "1".

Also, as shown in (b) of FIG. 3, when a skew occurs to delay the clock signal CLOCK to the data signal DATA, the values of the skew detection data are "0" which are obtained by latching the data sequence of "01110" in synchronization with the rear-side falling edges of the clock signals CLOCK#1 and CLOCK#2 of the multi-phase clock signal ((b) of FIG. 3) in which the phase of the clock signal is relatively delayed. When the delay of the clock signal CLOCK to the data signal DATA increases, the number of the skew detection data values of "0" increases.

Moreover, as shown in (c) of FIG. 3, when a skew occurs to delay the data signal DATA to the clock signal CLOCK, the values of the skew detection data are "0" which are obtained by latching the data sequence of "01110" in synchronization with the front-side falling edges of the clock signals CLOCK#0 and CLOCK#1 of the multi-phase clock signal ((c) of FIG. 3) whose phase is relatively lead. When the delay of the data signal DATA to the clock signal CLOCK increases, the number of the skew detection data values of "0" increases.

In this way, the occurrence of the skew can be detected through the existence of the values of the skew detection data of "0". Also, the direction of the skew can be determined (that is, which of the data signal DATA and the clock signal CLOCK is delayed) based on whether the value of the skew detection data of "0" is generated by latching in response to the front-side falling edge or the rear-side falling edge. Moreover, the degree of the skew can be determined based on the number of skew detection data values of "0". The delay control signal $S_{CTRL}$ is generated according to the skew detection data generated in this way. The skew between the data signal DATA and the clock signal CLOCK can be canceled by controlling or adjusting relative timing between the data signal DATA and the clock signal CLOCK in response to the delay control signal $S_{CTRL}$.

It should be noted that the clock signals CLOCK#0 to CLOCK#2 of the multi-phase clock signal in which the timing between the data signal DATA and the clock signal CLOCK has such a relation as shown in (a) to (c) of FIG. 3 can be generated by delaying the clock signal CLOCK by an optional delay time.

The skew detection data may be acquired by latching the delayed data signal $DATA_{DLY}$ obtained by delaying the data signal DATA, instead of the data signal DATA, in synchronization with the multi-phase clock signal. Even if the delayed data signal $DATA_{DLY}$ which is obtained by delaying the data signal DATA is used instead of the data signal DATA, the values of the skew detection data are only different and there is not an essential difference. In this case, the delay control signal $S_{CTRL}$ can be generated by changing according to need, the logic with which the delay control signal $S_{CTRL}$ is generated from the skew detection data.

Figure 4:
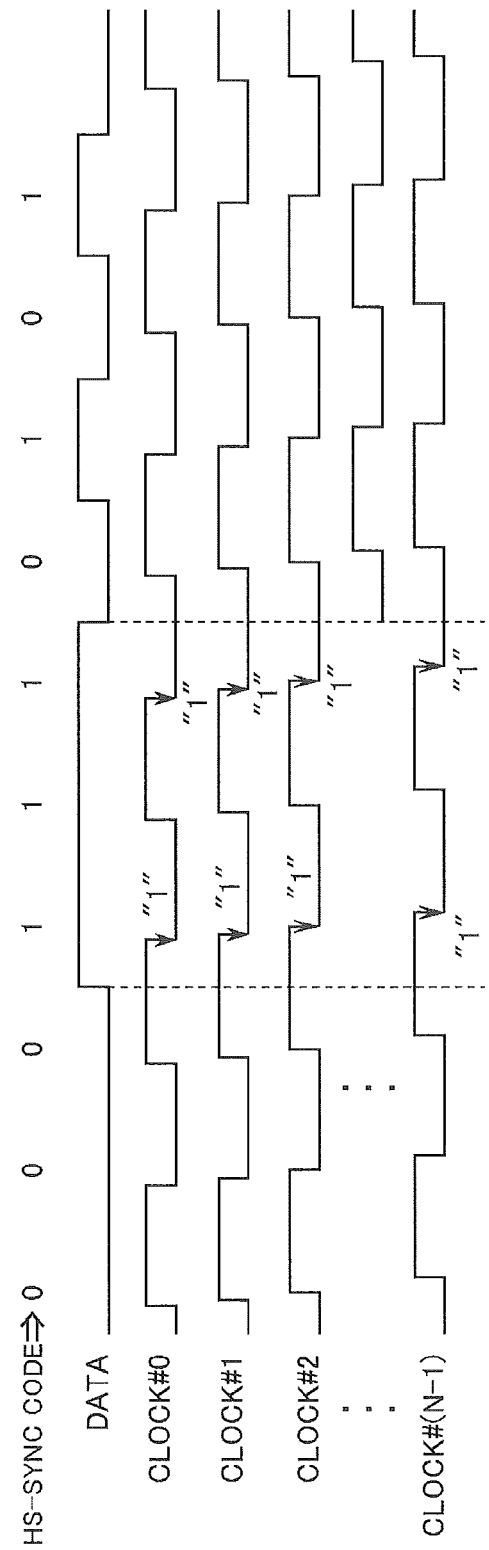
FIG. 4 is a timing chart showing a modification example of the operation of the transmission and reception system in the embodiment.

The three clock signals CLOCK#0 to CLOCK#2 of the multi-phase clock signal are used for the generation of the skew detection data in FIG. 3. However, the number of clock signals of the multi-phase clock signal is not limited to 3. The skew detection data may be generated by latching the data sequence of "01110" contained in the HS-SYNC code in synchronization with N clock signals CLOCK#0 to CLOCK#(N−1) (N is an integer equal to or more than 2) of the multi-phase clock signal as shown in FIG. 4.

Also, instead that the skew detection data is generated by latching the data signal DATA (or the delayed data signal $DATA_{DLY}$) in synchronization with clock signals CLOCK#0 to CLOCK#(N−1) of the multi-phase clock signal, the skew detection data may be generated by generating a plurality of data signals DATA#0 to DATA#(N−1) with different delay times from the data signal DATA, and latching each of the plurality of data signals in synchronization with the clock signal CLOCK, as shown in FIG. 5. In FIG. 5, a case where three data signals DATA#0 to DATA#2 are generated is shown. In this case, it is possible to detect a skew by use of the skew detection data.

For example, as shown in (a) of FIG. 5, when the timing between the data signal DATA and the clock signal CLOCK is normal, the first of "1" in the data sequence of "01110" of each of the data signals DATA#0 to DATA#2 is latched in synchronizes with the front-side falling edge of the clock signal CLOCK and the third of "1" is latched in synchronization with the rear-side falling edge thereof. As a result, all the values of the skew detection data are "1".

Also, as shown in (b) of FIG. 5, when a skew occurs to delay the clock signal CLOCK to the data signal DATA, the values of the skew detection data are "0" which are obtained by latching the data signals DATA#0 and DATA#1 of the data signals (the data signals DATA#0 to DATA#2 in (b) of FIG. 5) in which the phase is lead relatively, in synchronization with the rear-side falling edge of the clock signal CLOCK. When the delay of the clock signal CLOCK to the data signal DATA increases, the number of skew detection data values of "0" increases.

Moreover, as shown in (c) of FIG. 5, when a skew occurs to delay the data signal DATA to the clock signal CLOCK, the values of the skew detection data are "0" which are obtained by latching the data signals in which the phase is relatively delayed (the data signals DATA#1 and DATA#2 in (c) of FIG. 5) of the data signals DATA#0 to DATA#2, in synchronization with the front-side falling edge of the clock signal CLOCK. When the delay of the data signal DATA to the clock signal CLOCK increases, the number of skew detection data values of "0" increases.

In this way, even in case where the skew detection data is generated by latching the plurality of data signals DATA#0 to DATA#(N−1) with different delay times in synchronization with the clock signal CLOCK, the generation of the skew can be detected through the existence of the values of the skew detection data of "0".

In the above-mentioned embodiments, the data sequence of "01110" contained in the HS-SYNC code is used for the generation of the skew detection data but another data sequence contained in the HS-SYNC code may be used for the generation of the skew detection data. FIG. 6A shows a case to generate the the skew detection data by using the data sequence of "0011" which is contained in the HS-SYNC code.

As shown in (a) of FIG. 6A, when the timing between the data signal DATA and the clock signal CLOCK is correct, the second of "0" of the data sequence of "0011" is latched in synchronization with specific rising edges of the clock signals CLOCK#0 to CLOCK#2 of the multi-phase clock signal, and the first of "1" is latched in synchronization with a falling edge next to the rising edge. As a result, all the values of the skew detection data which are obtained in synchronization with the rising edges are "0" and all the values of the skew detection data which are obtained in synchronization with the next falling edges are "1".

Also, as shown in (b) of FIG. 6A, when a skew occurs to delay the clock signal CLOCK to the data signal DATA, the values of the skew detection data are "0" which are obtained by latching in synchronization with a specific rising edge of the clock signal CLOCK#0 with a lead phase of the clock signals CLOCK#0 to CLOCK#2 of the multi-phase clock signal. On the contrary, the values of the skew detection data are "1" which are obtained by latching the data signal in synchronization with the rising edges corresponding to the specific rising edges of the clock signals (the clock signals CLOCK#1 and CLOCK#2 of the multi-phase clock signal in (b) of FIG. 6A) with delayed phase. When the delay of the clock signal CLOCK to the data signal DATA increases, the number of skew detection data values which are obtained as "1" increases.

Moreover, as shown in (c) of FIG. 6A, when a skew occurs to delay the data signal DATA to the clock signal CLOCK, the values of the skew detection data are "1" which are obtained by latching the data signal in synchronization with a specific falling edge of the clock signal CLOCK#2 with the delayed phase, of the clock signals CLOCK#0 to CLOCK#2 of the multi-phase clock signal. On the other hand, the values of the skew detection data are "0" which are obtained by latching the data signal in synchronization with a falling edge corresponding to the specific falling edge of the clock signal with lead phase (the clock signals CLOCK#0 and CLOCK#1 in (c) of FIG. 6A). When the delay of the data signal DATA to the clock signal CLOCK increases, the number of skew detection data values which are obtained as "0" increases.

In this way, the generation of the skew can be detected from the values of the skew detection data even in case to generate the skew detection data by using the data sequence of "0011" of the HS-SYNC code.

Also, FIG. 6B shows a case to generate the skew detection data by using the data sequence of "1101" which is contained in the HS-SYNC code.

As shown in (a) of FIG. 6B, when the timing between the data signal DATA and the clock signal CLOCK is normal, the second of "1" of the data sequence of "1100" is latched in synchronization with a specific falling edge of each of the clock signals CLOCK#0 to CLOCK#2 of the multi-phase clock signal, and the first of "0" is latched in synchronization with a rising edge next to the above falling edge. As a result, all the values of the skew detection data are "1" which values are obtained in synchronization with the rising edge and all the values of the skew detection data are "0" which are obtained in synchronization with the next falling edge.

Also, as shown in (b) of FIG. 6B, when a skew occurs to delay the clock signal CLOCK to the data signal DATA, the values of the skew detection data are "1" which are obtained by latching in synchronization with a specific rising edge of the clock signal CLOCK#0 with a lead phase, of the clock signals CLOCK#0 to CLOCK#2 of the multi-phase clock signal. The values of the skew detection data are "0" which are obtained by latching in synchronization with a falling edge (a specific falling edge) next to the specific rising edge. On the other hand, the values of the skew detection data are "1" which values are obtained by latching in synchronization with rising edges corresponding to the specific rising edges of the clock signals CLOCK#1 and CLOCK#2 with a delayed phase. The values of the skew detection data are "0" which are obtained by latching in synchronization with the falling edges corresponding to the specific falling edges of the clock signals CLOCK#1 and CLOCK#2.

Moreover, as shown in (c) of FIG. 6A, when the skew occurs to delay the data signal DATA to the clock signal CLOCK, the values of the skew detection data are "0" which are obtained by latching in synchronization with a specific rising edge of the clock signal CLOCK#2 with the delayed phase, of the clock signals CLOCK#0 to CLOCK#2 of the multi-phase clock signal. On the other hand, the values of the skew detection data are "1" which are obtained by latching in synchronization with a rising edge corresponding to the specific rising edges of the clock signals with lead phase (the clock signals CLOCK#0 and CLOCK#1 in (c) of FIG. 6B). When the delay of the data signal DATA to the clock signal CLOCK increases, the number of skew detection data values which are obtained as "1" increases.

In this way, the generation of the skew can be detected from the values of the skew detection data even in case to generate the skew detection data by using the data sequence of "1101" of the HS-SYNC code.

As understood from FIG. 3 to FIG. 5, FIG. 6A, and FIG. 6B, generally, the skew detection data can be generated by latching an optional data sequence with known values. However, it is desired to generate the skew detection data in synchronization with a falling edge or a rising edge of the clock signal CLOCK or each of the clock signals CLOCK#0 to CLOCK#(N−1). A case to generate the skew detection data in synchronization with only the falling edges of the clock signals CLOCK#0 to CLOCK#(N−1) is shown in FIG. 3 and FIG. 4, and a case to generate the skew detection data in synchronization with only the falling edge of the clock signal CLOCK is shown in FIG. 5. As shown in FIG. 6A and FIG. 6B, when both of the rising edge and the falling edge are used in case of generation of the skew detection data, both of a circuit which latches the data signal DATA (or the data signals DATA#0 to DATA#(N−1)) in synchronization with the rising edge and a circuit which latches the data signal DATA (or the data signals DATA#0 to DATA#(N−1)) in synchronization with the falling edge are required. It is not desirable from the view of increase in a circuit scale. In the configuration (the configuration which carries out the operations of FIG. 3 to FIG. 5) which the skew detection data is generated in synchronization with only one of the falling edge and the rising edge of the clock signal CLOCK or each of the clock signals CLOCK#0 to CLOCK#(N−1) of the multi-phase clock signal, the circuit scale of the circuit which is used for the generation of the skew detection data can be made small.

It should be noted that when the transmission of the data signal DATA and the clock signal CLOCK is carried out based on the standard except the MIPI D-PHY standard, attention should be paid to the fact that the skew detection data can be generated by latching the specific data sequence which is sent to the receiver 2 at a specific timing, in synchronization with the multi-phase clock signal generated from the clock signal CLOCK.

Figure 7:
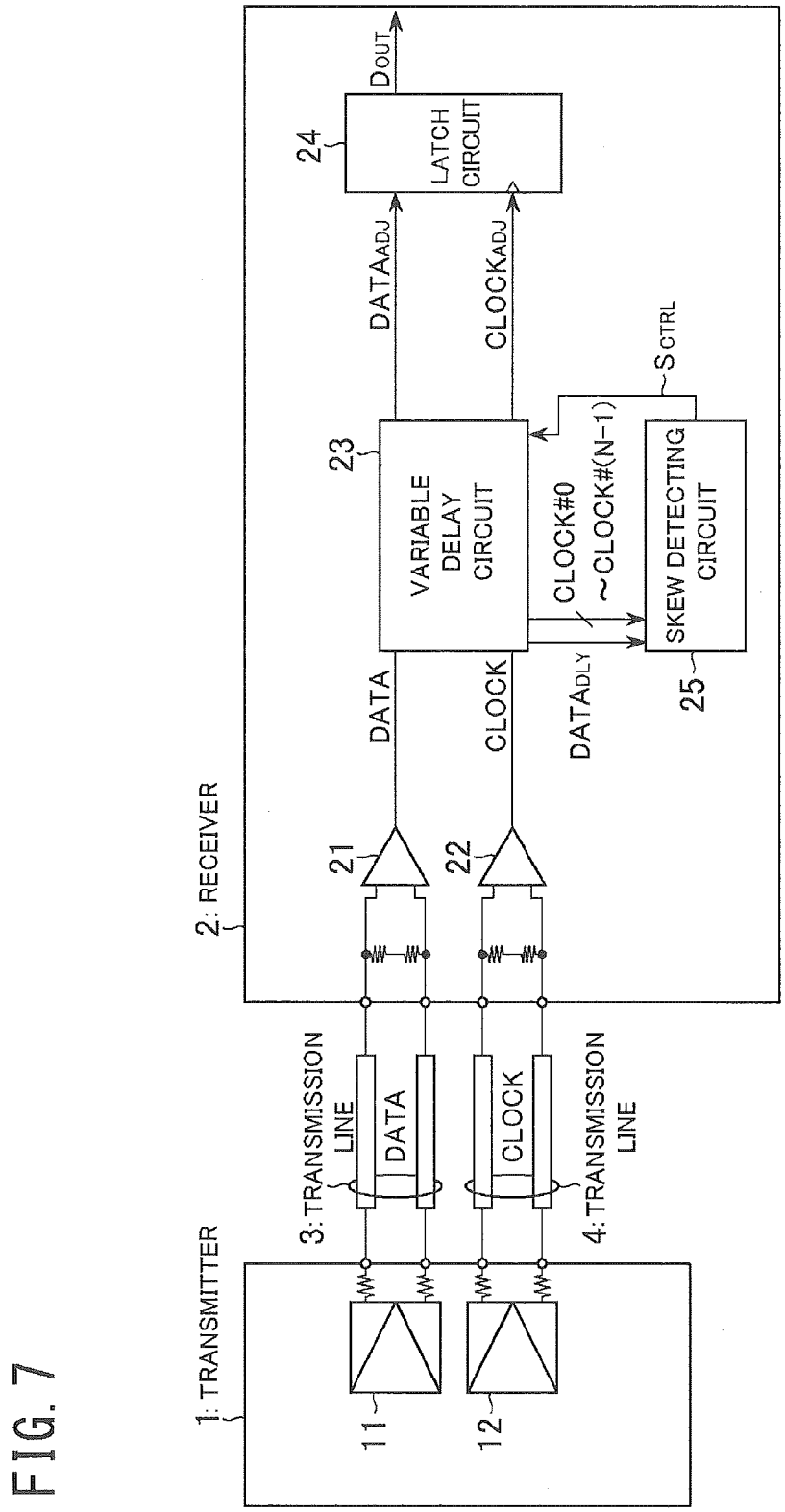
FIG. 7 is a block diagram showing the configuration of the transmission and reception system according to another embodiment.

Also, as shown in FIG. 7, when the clock signals CLOCK#0 to CLOCK#(N−1) of the multi-phase clock signal are generated by the variable delay circuit 23 and the clock signals CLOCK#0 to CLOCK#(N−1) of the multi-phase clock signal are used for the generation of the skew detection data in the skew detecting circuit 25, the clock signals CLOCK#0 to CLOCK#(N−1) of the multi-phase clock signal may be supplied to the skew detecting circuit 25 from the variable delay circuit 23. In this case, the clock signals CLOCK#0 to CLOCK#(N−1) of the multi-phase clock signal are not generated in the skew detecting circuit 25. Such a configuration is effective when the delay-adjusted clock signal CLOCK$_{ADJ}$ outputted from the variable delay circuit 23 is selected from the clock signals CLOCK#0 to CLOCK#(N−1) of the multi-phase clock signal.

Figure 8:
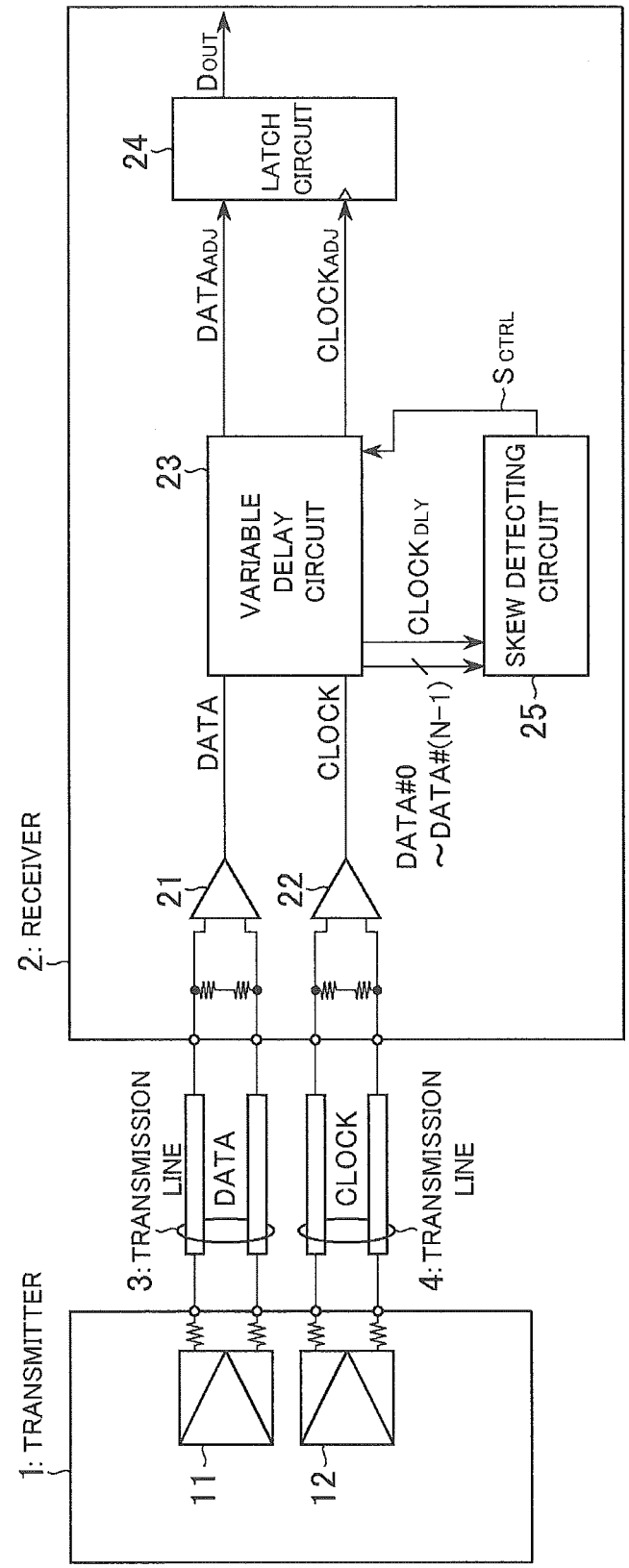
FIG. 8 is a block diagram showing the configuration of the transmission and reception system according to another embodiment.

In the same way, as shown in FIG. 8, when the data signals DATA#0 to DATA#(N−1) are generated by the variable delay circuit 23 and the data signals DATA#0 to DATA#(N−1) are used for the generation of the skew detection data by the skew detecting circuit 25, the data signals DATA#0 to DATA#(N−1) may be supplied from the variable delay circuit 23 to the skew detecting circuit 25. In this case, the data signals DATA#0 to DATA#(N−1) are not generated in the skew detecting circuit 25. Such a configuration is effective when the delay-adjusted data signal DATA$_{ADJ}$ outputted from the variable delay circuit 23 is selected from the data signals DATA#0 to DATA#(N−1).

Figure 9:
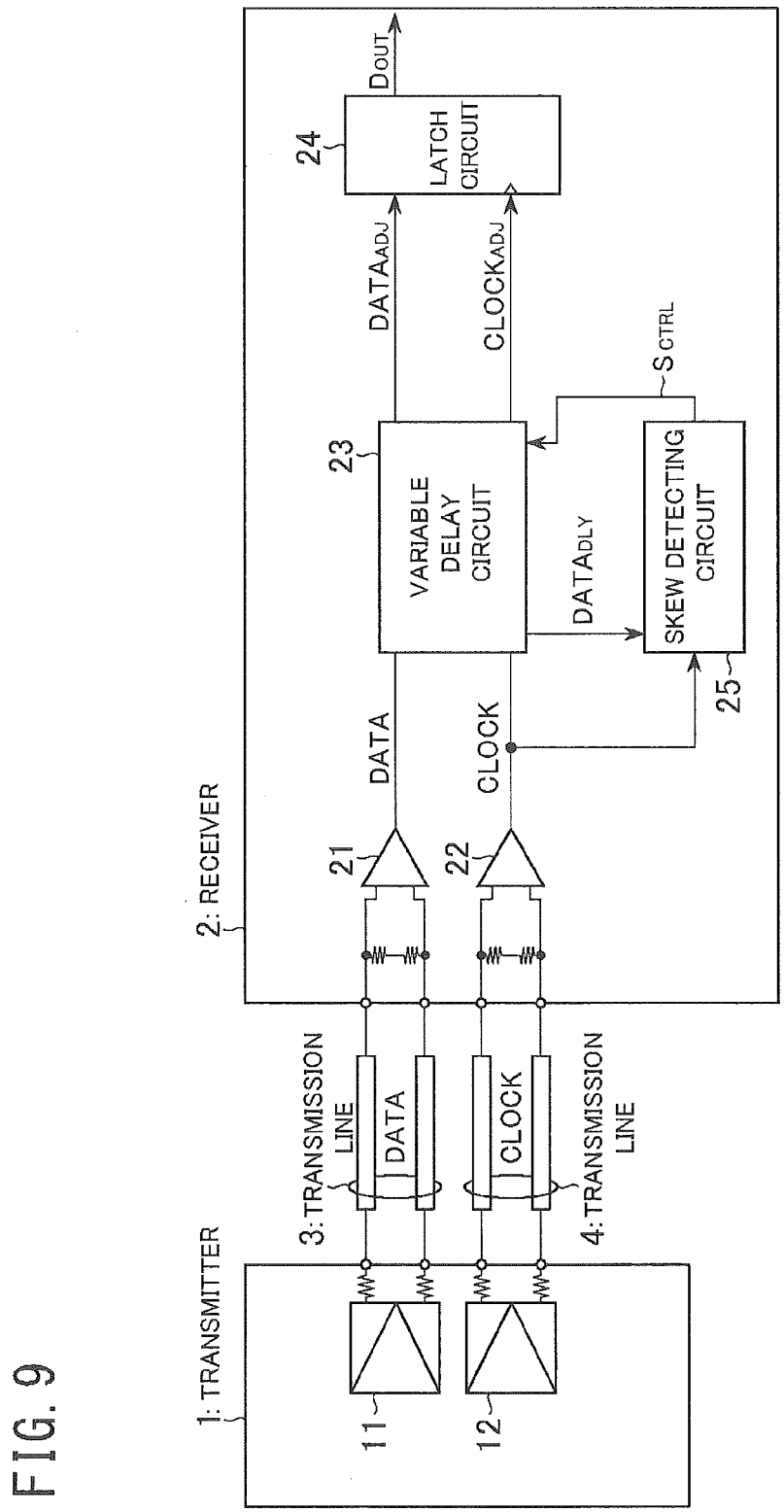
FIG. 9 is a block diagram showing the configuration of the transmission and reception system according to another embodiment.

Moreover, as shown in FIG. 9, when the data signal DATA is delayed by the variable delay circuit 23 so as to generate the delayed data signal DATA$_{DLY}$ and the delayed data signal DATA$_{DLY}$ is used for the generation of the skew detection data in the skew detecting circuit 25, the delayed data signal DATA$_{DLY}$ may be supplied from the variable delay circuit 23 to the skew detecting circuit 25. It should be noted that the configuration in which the delayed data signal DATA$_{DLY}$ is supplied to the skew detecting circuit 25 from the variable delay circuit 23 is also shown in FIG. 7.

Figure 10:
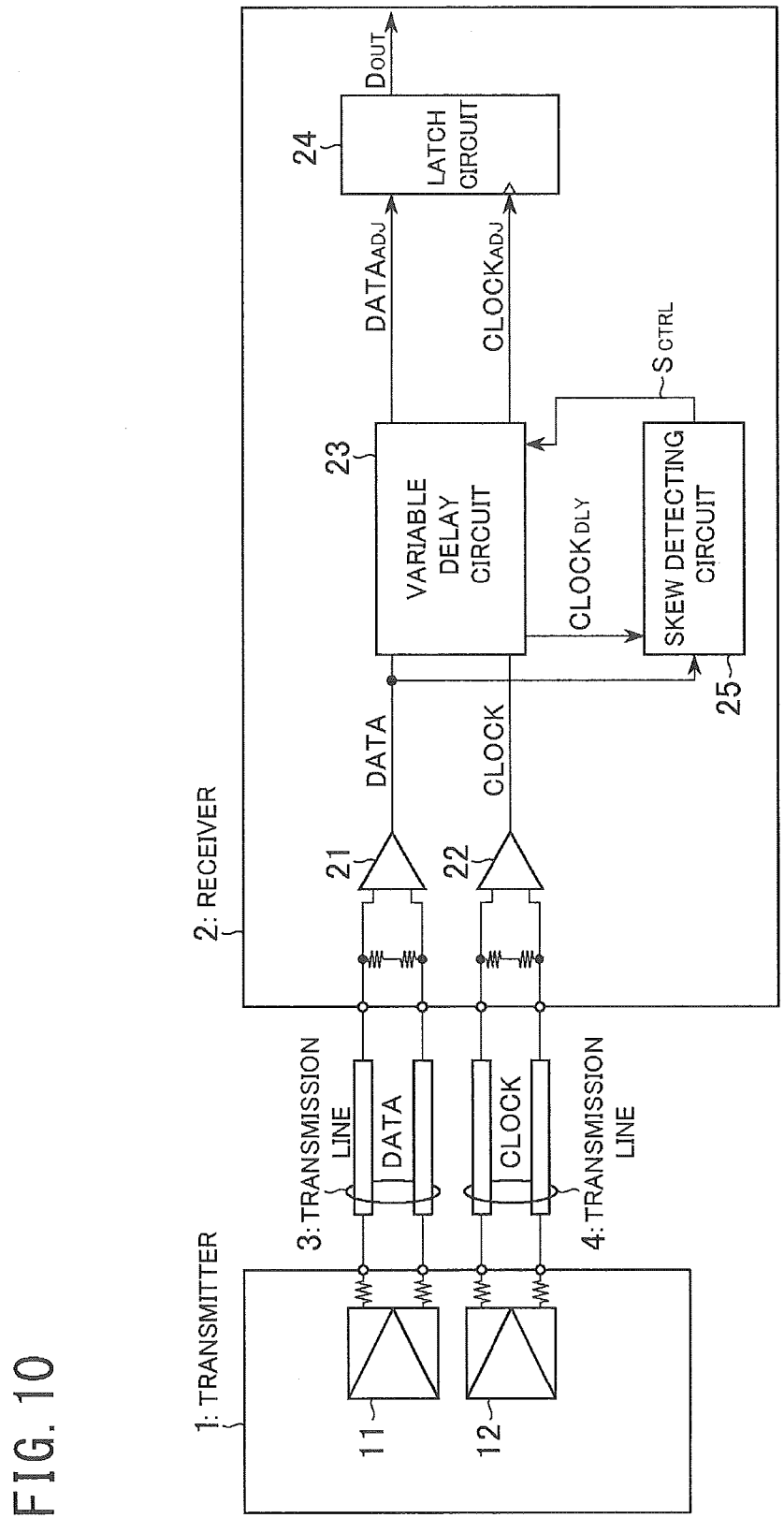
FIG. 10 is a block diagram showing the configuration of the transmission and reception system according to another embodiment.

In the same way, as shown in FIG. 10, when the clock signal CLOCK is delayed in the variable delay circuit 23 so as to generate the delayed clock signal CLOCK$_{DLY}$ and the delayed clock signal CLOCK$_{DLY}$ is used for the generation of the skew detection data in the skew detecting circuit 25, the delayed clock signal CLOCK$_{DLY}$ may be supplied to the skew detecting circuit 25 from the variable delay circuit 23.

Below, specific examples of the above embodiments, especially, the variable delay circuit 23, the latch circuit 24 and the skew detecting circuit 25 will be described.

Exemplary Embodiment 1

Figure 11:
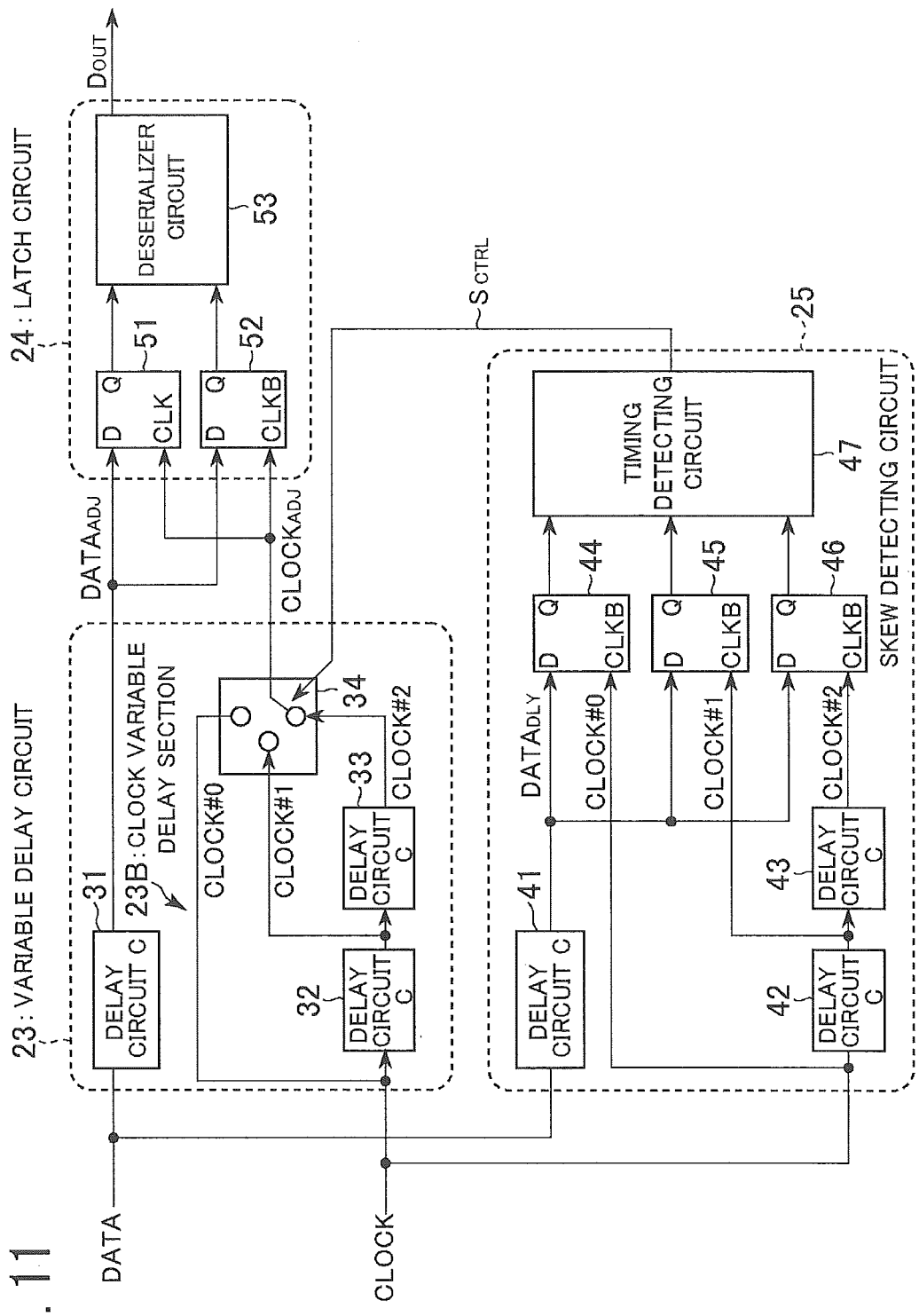
FIG. 11 is a block diagram showing the configuration of a variable delay circuit, a latch circuit and a skew detecting circuit in an exemplary embodiment 1.

FIG. 11 is a block diagram showing the configuration of the variable delay circuit 23, the latch circuit 24 and the skew detecting circuit 25 in an exemplary embodiment 1. The circuit configuration shown in FIG. 11 is a specific example of the variable delay circuit 23, the latch circuit 24 and the skew detecting circuit 25 shown in FIG. 1.

In the exemplary embodiment 1, the variable delay circuit 23 is composed of delay circuits 31 to 33 and a selecting circuit 34. The delay circuit 31 generates a delay-adjusted data signal DATA$_{ADJ}$ by delaying the data signal DATA. In the present embodiment, the delay time of the delay circuit 31 is fixed.

The delay circuits 32 and 33 and the selecting circuit 34 configures a clock variable delay section 23B which generates the delay-adjusted clock signal CLOCK$_{ADJ}$ obtained by delaying the clock signal CLOCK in response to the delay control signal S$_{CTRL}$ which is supplied from the skew detecting circuit 25. In detail, the delay circuits 32 and 33 are a circuit section which generates the clock signals CLOCK#0 to CLOCK#2 of the multi-phase clock signal from the clock signal CLOCK. In the present exemplary embodiment, the clock signal CLOCK which is supplied to the variable delay circuit 23 is used just as it is as the clock signal CLOCK#0. The delay circuit 32 generates the clock signal CLOCK#1 by delaying the clock signal CLOCK#0. The delay circuit 33 generates the clock signal CLOCK#2 by delaying the clock signal CLOCK#1. The selecting circuit 34 selects either of the clock signals CLOCK#0 to CLOCK#2 of the multi-phase clock signal in response to the delay control signal S$_{CTRL}$ and outputs the selected clock signal as the delay-adjusted clock signal CLOCK$_{ADJ}$.

The latch circuit 24 is composed of D-type flip-flops 51 and 52 and a deserializer circuit 53. The D-type flip-flop 51 latches the delay-adjusted data signal DATA$_{ADJ}$ in synchronization with a rising edge of the delay-adjusted clock signal CLOCK$_{ADJ}$. On the other hand, the D-type flip-flop 52 latches the delay-adjusted data signal $DATA_{ADJ}$ in synchronization with a falling edge of the delay-adjusted clock signal $CLOCK_{ADJ}$. The deserializer circuit 53 carries out a deserializing process to the data outputted from the D-type flip-flops 51 and 52 and generates an output data signal $D_{OUT}$. Note that the latch circuit 24 of such a configuration latches the delay-adjusted data signal $DATA_{ADJ}$ in synchronization with both of the rising edge and falling edge of the delay-adjusted clock signal $CLOCK_{ADJ}$.

The skew detecting circuit 25 is composed of delay circuits 41 to 43, D-type flip-flops 44 to 46 and a timing detecting circuit 47. The delay circuit 41 generates the delayed data signal $DATA_{DLY}$ by delaying the data signal DATA. The delay circuits 42 and 43 are a circuit section which generates the clock signals CLOCK#0 to CLOCK#2 of the multi-phase clock signal from the clock signal CLOCK. In the present exemplary embodiment 1, the clock signal CLOCK which is supplied to the skew detecting circuit 25 is used just as it is as the clock signal CLOCK#0. The delay circuit 42 generates the clock signal CLOCK#1 by delaying the clock signal CLOCK#0. The delay circuit 43 generates the clock signal CLOCK#2 by delaying the clock signal CLOCK#1.

The D-type flip-flops 44 to 46 latch the delayed data signal $DATA_{DLY}$ in synchronization with the falling edges of the clock signals CLOCK#0 to CLOCK#2 of the multi-phase clock signal, respectively. The data which are outputted from the D-type flip-flops 44 to 46 are used as the skew detection data.

The timing detecting circuit 47 generates the delay control signal $S_{CTRL}$ based on the skew detection data which is outputted from the D-type flip-flops 44 to 46. In the present exemplary embodiment, the delay control signal $S_{CTRL}$ is generated as a signal to instruct which of the clock signals CLOCK#0 to CLOCK#2 of the multi-phase clock signal should be selected, to the selecting circuit 34 of the variable delay circuit 23. The logic for determining which of the clock signals CLOCK#0 to CLOCK#2 of the multi-phase clock signal should be selected, based on the values of the skew detection data is incorporated in the timing detecting circuit 47.

The delay circuits 31 to 33 of the variable delay circuit 23 and the delay circuits 41 to 43 of the skew detecting circuit 25 in the exemplary embodiment 1 have "substantially" the same delay time C. Here, the word "substantial" means ignoring a variation which is caused inevitably upon manufacturing.

Figure 12:
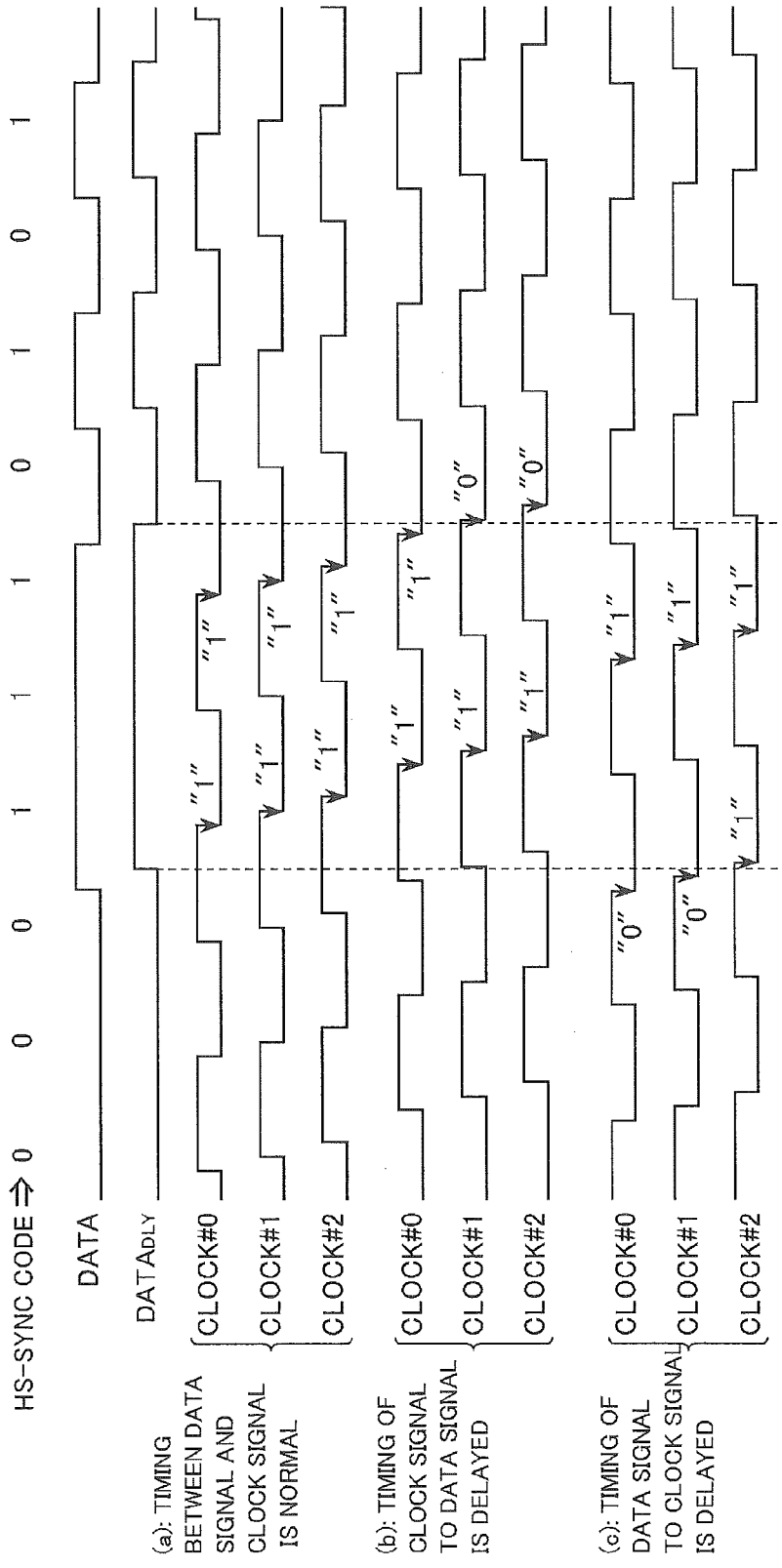
FIG. 12 is a timing chart showing the operation of a skew detecting circuit in the exemplary embodiment 1.

FIG. 12 is a timing chart showing operations of the skew detecting circuit 25 in the exemplary embodiment 1. As shown in (a) of FIG. 12. when the timing between the data signal DATA and the clock signal CLOCK is normal, the first of "1" of the data sequence of "01110" transmitted as the delayed data signal $DATA_{DLY}$ is latched in synchronization with the front-side falling edges of the clock signals CLOCK#0 to CLOCK#2 of the multi-phase clock signal, and the third of "1" is latched in synchronization with each of the rear-side falling edges. As a result, all the values of the skew detection data are "1". In this case, the delay control signal $S_{CTRL}$ sent from the skew detecting circuit 25 to the variable delay circuit 23 is generated to select the clock signal CLOCK#1 of the multi-phase clock signal which has an intermediate phase according to the skew detection data. Through such an operation, the margin of the operation timing of the D-type flip-flops 51 and 52 of the latch circuit 24 can be made large.

Also, as shown in (b) of FIG. 12, when a skew occurs to delay the clock signal CLOCK to the data signal DATA, the values of the skew detection data are "0" which are obtained by latching the data sequence of "01110" transmitted by the data signal $DATA_{DLY}$ in synchronization with the rear-side falling edges of the multi-phase clock signal (the clock signals CLOCK#1 and CLOCK#2 in (b) of FIG. 12) with delayed phase. In this case, the delay control signal $S_{CTRL}$ sent from the skew detecting circuit 25 to the variable delay circuit 23 is generated to select the clock signal CLOCK#0 of the multi-phase clock signal with the phase which is relatively lead or advanced, according to the skew detection data. Through such an operation, the margin of the operation timing of the D-type flip-flops 51 and 52 of the latch circuit 24 can be made large.

Moreover, as shown in (c) of FIG. 12, when a skew occurs to delay the data signal DATA to the clock signal CLOCK, the values of the skew detection data are "0" which are obtained by latching in synchronization with the front-side falling edges of the multi-phase clock signal (the clock signals CLOCK#0 and CLOCK#1 in (c) of FIG. 12) with a lead phase. In this case, the delay control signal $S_{CTRL}$ sent from the skew detecting circuit 25 to the variable delay circuit 23 is generated to select the clock signal CLOCK#2 of the multi-phase clock signal with the phase to have been relatively delayed, according to the skew detection data. Through such an operation, the margin of the operation timing of the D-type flip-flops 51 and 52 of the latch circuit 24 can be made large.

In any case, in the present exemplary embodiment 1, the delay control signal $S_{CTRL}$ is generated according to the skew detection data which is obtained by latching the data sequence of "01110" transmitted by the delayed data signal $DATA_{DLY}$ in synchronization with the falling edges of the clock signals CLOCK#0 to CLOCK#2 of the multi-phase clock signal. The selecting circuit 34 of the variable delay circuit 23 is controlled based on the delay control signal $S_{CTRL}$. Thus, a relative delay between the delay-adjusted data signal $DATA_{ADJ}$ and the delay-adjusted clock signal $CLOCK_{ADJ}$ is adjusted. The skew between the delay-adjusted data signal $DATA_{ADJ}$ and the delay-adjusted clock signal $CLOCK_{ADJ}$ can be made small.

Exemplary Embodiment 2

Figure 13:
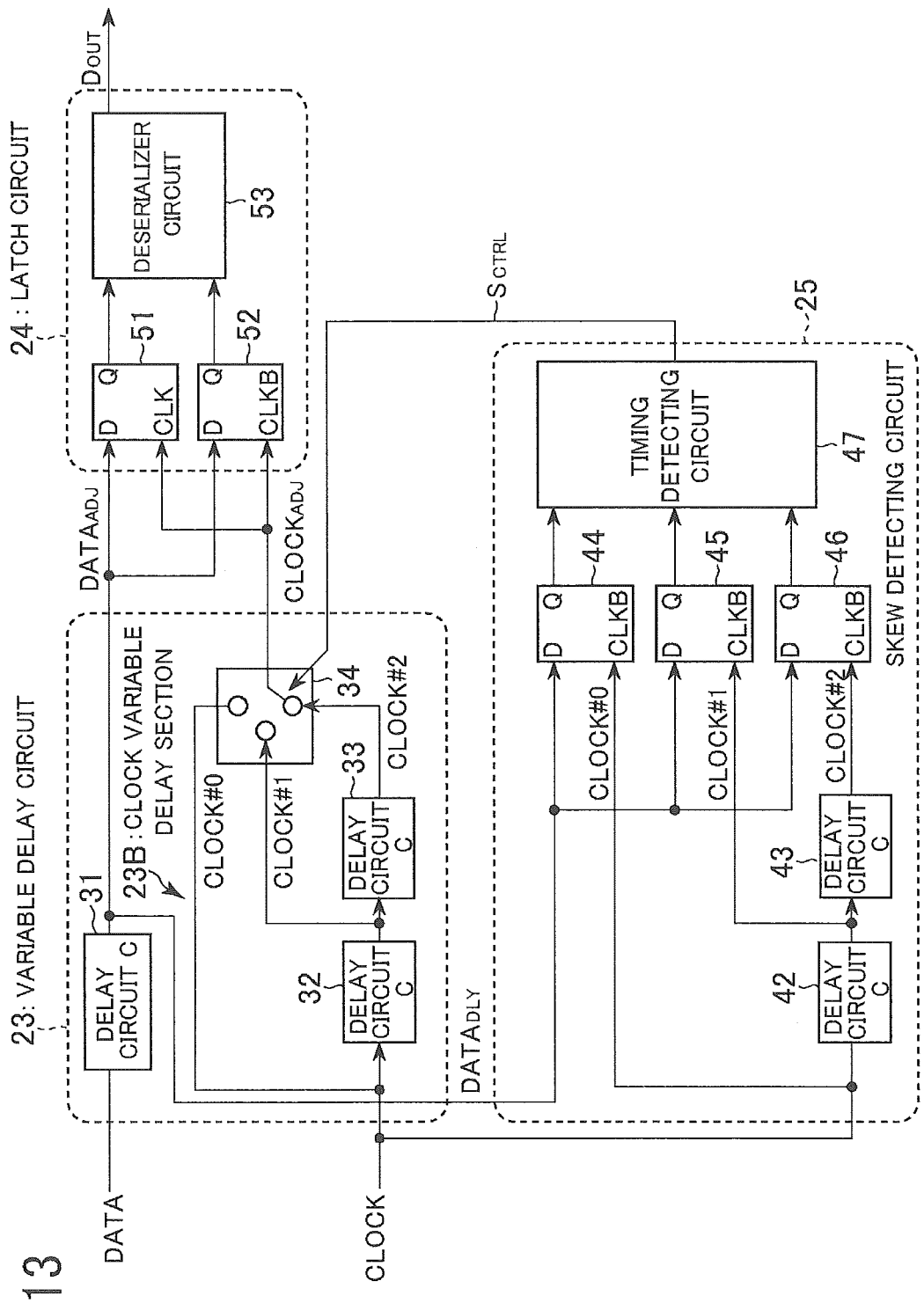
FIG. 13 is a block diagram showing the configuration of the variable delay circuit, the latch circuit and the skew detecting circuit in an exemplary embodiment 2.

FIG. 13 is a block diagram showing the configuration of the variable delay circuit 23, the latch circuit 24 and the skew detecting circuit 25 in an exemplary embodiment 2. The circuit configuration shown in FIG. 13 is a specific example of the variable delay circuit 23, the latch circuit 24 and the skew detecting circuit 25 shown in FIG. 9.

The circuit configuration of the exemplary embodiment 2 shown in FIG. 13 is similar to the circuit configuration of the exemplary embodiment 1 shown in FIG. 11. A difference point is in that the delay circuit 41 is removed from the skew detecting circuit 25, and the delayed data signal $DATA_{DLY}$ is supplied to the skew detecting circuit 25 from the variable delay circuit 23 in the circuit configuration of the exemplary embodiment 2. The delay-adjusted data signal $DATA_{ADJ}$ outputted from the delay circuit 31 of the variable delay circuit 23 is used as the delayed data signal $DATA_{DLY}$ which is supplied to the skew detecting circuit 25. The delayed data signal $DATA_{DLY}$ having been supplied to the skew detecting circuit 25 is supplied to the D-type flip-flops 44 to 46.

According to the circuit configuration of the exemplary embodiment 2 shown in FIG. 13, the number of delay circuits can be decreased as compared with the circuit configuration of the exemplary embodiment 1. It should be noted that the operations of the variable delay circuit 23, the latch circuit 24 and the skew detecting circuit 25 in the exemplary embodi-

Exemplary Embodiment 3

Figure 14:
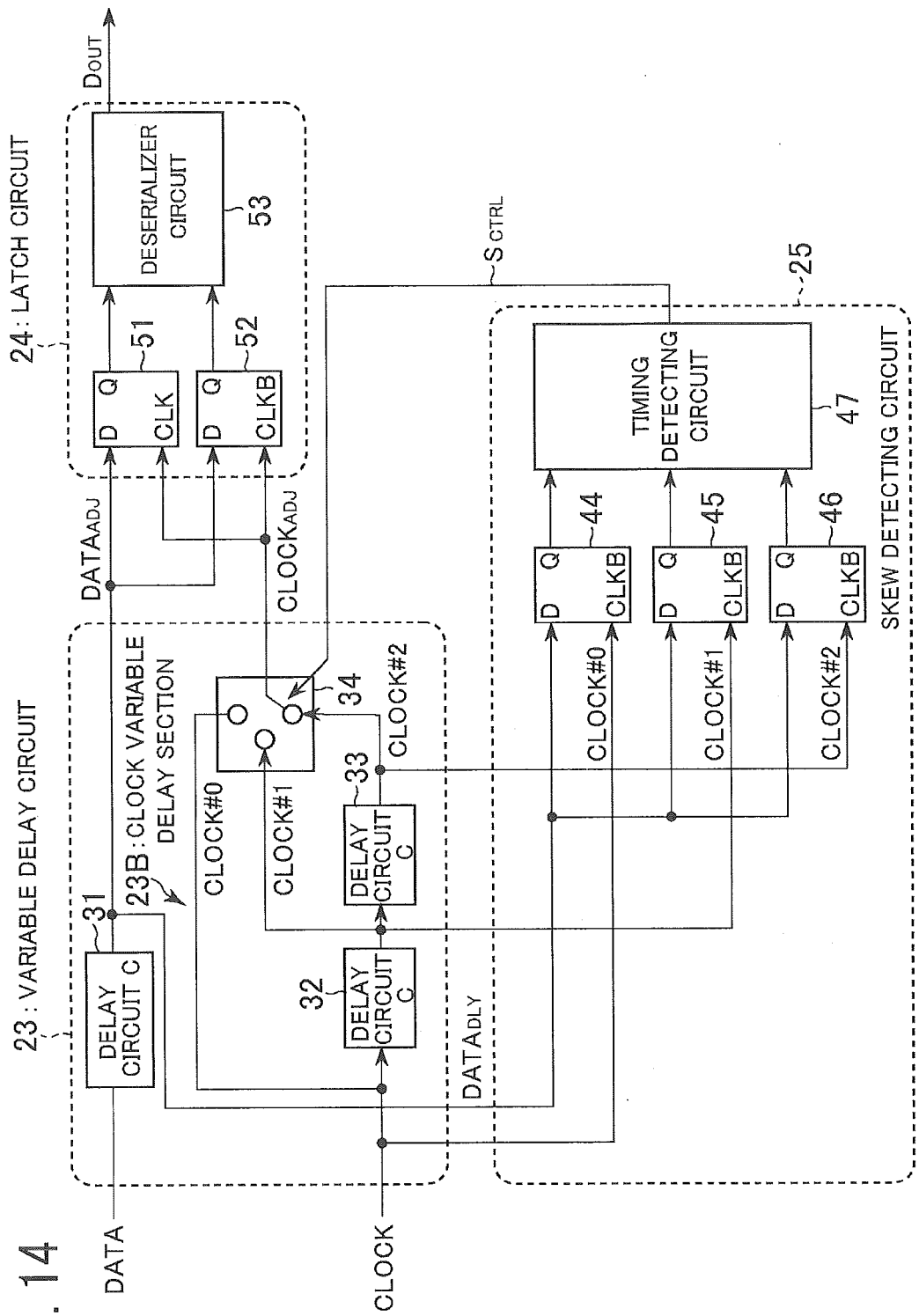
FIG. 14 is a block diagram showing the configuration of the variable delay circuit, the latch circuit and the skew detecting circuit in an exemplary embodiment 3.

FIG. 14 is a block diagram showing the configuration of the variable delay circuit 23, the latch circuit 24 and the skew detecting circuit 25 in an exemplary embodiment 3. The circuit configuration shown in FIG. 14 is a specific example of the variable delay circuit 23, the latch circuit 24 and the skew detecting circuit 25 shown in FIG. 7.

The circuit configuration of the exemplary embodiment 3 shown in FIG. 14 is similar to the circuit configuration of the exemplary embodiment 2 shown in FIG. 13. A difference point is in that the delay circuits 42 and 43 are removed from the skew detecting circuit 25 in the circuit configuration of the exemplary embodiment 3 and the clock signals CLOCK#0 to CLOCK#2 of the multi-phase clock signal are supplied to the skew detecting circuit 25 from the variable delay circuit 23. The clock signal CLOCK#1 outputted from the delay circuit 32 is supplied to the D-type flip-flop 45 of the skew detecting circuit 25 in addition to the selecting circuit 34. Also, the clock signal CLOCK#2 outputted from the delay circuit 33 is supplied to the D-type flip-flop 46 of the skew detecting circuit 25 in addition to the selecting circuit 34. Here, note that in the exemplary embodiment 3, the clock signal CLOCK is used just as it is as the clock signal CLOCK#0.

According to the circuit configuration of the exemplary embodiment 3 shown in FIG. 14, the number of delay circuits can be further decreased, as compared with the circuit configuration of the exemplary embodiment 2. It should be noted that the operations of the variable delay circuit 23, the latch circuit 24 and the skew detecting circuit 25 in the exemplary embodiment 3 are the same as those of the exemplary embodiment 1, and, therefore, the description is omitted.

Exemplary Embodiment 4

Figure 15:
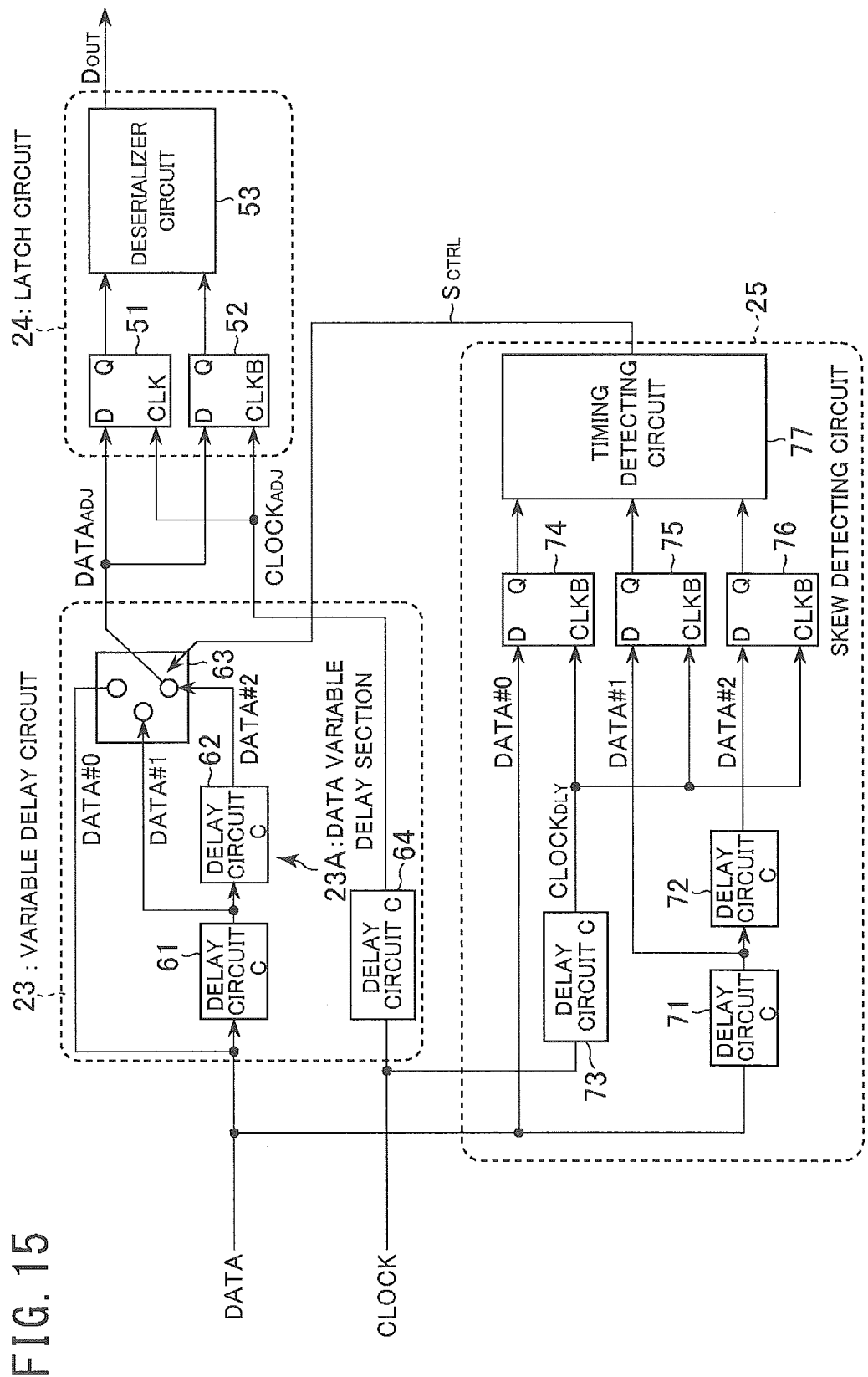
FIG. 15 is a block diagram showing the configuration of the variable delay circuit, the latch circuit and the skew detecting circuit in an exemplary embodiment 4.

FIG. 15 is a block diagram showing the configuration of the variable delay circuit 23, the latch circuit 24 and the skew detecting circuit 25 in an exemplary embodiment 4. The circuit configuration shown in FIG. 15 is another exemplary embodiment of the variable delay circuit 23, the latch circuit 24 and the skew detecting circuit 25 shown in FIG. 1.

In the exemplary embodiment 4, the variable delay circuit 23 is composed of delay circuits 61 and 62, a selecting circuit 63 and a delay circuit 64. The delay circuits 61 and 62 and the selecting circuit 63 configures a variable delay section 23A which generates the delay-adjusted data signal $DATA_{ADJ}$ as a delayed signal obtained by delaying the data signal DATA in response to the delay control signal $S_{CTRL}$ supplied from the skew detecting circuit 25. In detail, the delay circuits 61 and 62 are a circuit section which generates the data signals DATA#0 to DATA#2 having different delay times from the data signal DATA. In the present exemplary embodiment, the data signal DATA which is supplied to the variable delay circuit 23 is used just as it is as the data signal DATA#0. The delay circuit 61 generates the data signal DATA#1 by delaying the data signal DATA#0. The delay circuit 62 generates the data signal DATA#2 by delaying the data signal DATA#1. The selecting circuit 63 selects either of the data signals DATA#0 to DATA#2 as the delay-adjusted data signal $DATA_{ADJ}$ in response to the delay control signal $S_{CTRL}$ and outputs the selected data signal. The delay circuit 64 generates the delay-adjusted clock signal $CLOCK_{ADJ}$ by delaying the clock signal CLOCK. In the present exemplary embodiment, the delay time of the delay circuit 64 is fixed.

The configuration of the latch circuit 24 in the exemplary embodiment 4 is the same as the latch circuit 24 in the examples 1 to 3. In detail, the latch circuit 24 in the exemplary embodiment 4 is composed of the D-type flip-flops 51 and 52 and the deserializer circuit 53. The D-type flip-flop 51 latches the data signal $DATA_{ADJ}$ in synchronization with the rising edge of the delay-adjusted clock signal $CLOCK_{ADJ}$. On the other hand, the D-type flip-flop 52 latches the delay-adjusted data signal $DATA_{ADJ}$ in synchronization with the falling edge of the delay-adjusted clock signal $CLOCK_{ADJ}$. The deserializer circuit 53 carries out the deserialization process to the data which are outputted from the D-type flip-flops 51 and 52 and generates an output data signal $D_{OUT}$. Note that the latch circuit 24 of such a configuration latches the delay-adjusted data signal $DATA_{ADJ}$ in synchronization with both of the rising edge and falling edge of the delay-adjusted clock signal $CLOCK_{ADJ}$.

Also, in the exemplary embodiment 4, the skew detecting circuit 25 is composed of delay circuits 71 to 73, D-type flip-flops 74 to 76 and a timing detecting circuit 77. The delay circuits 71 and 72 are a circuit section which generates the data signals DATA#0 to DATA#2 from the data signal DATA. In the present exemplary embodiment 4, the data signal DATA which is supplied to the skew detecting circuit 25 is used just as it is as the data signal DATA#0. The delay circuit 71 generates the data signal DATA#1 by delaying the data signal DATA#0. The delay circuit 72 generates the data signal DATA#2 by delaying the data signal DATA#1. On the other hand, the delay circuit 73 generates the delayed clock signal $CLOCK_{DLY}$ by delaying the clock signal CLOCK.

The D-type flip-flops 74 to 76 latch the data signals DATA#0 to DATA#2 in synchronization with the falling edge of the delayed clock signal $CLOCK_{DLY}$, respectively. The data which are outputted from the D-type flip-flops 74 to 76 are used as the values of the skew detection data.

The timing detecting circuit 77 generates the delay control signal $S_{CTRL}$ according to the skew detection data values which are outputted from the D-type flip-flops 74 to 76. In the present exemplary embodiment 4, the delay control signal $S_{CTRL}$ is generated as a signal to specify which of the data signals DATA#0 to DATA#2 should be selected, by the selecting circuit 34 of the variable delay circuit 23. The logic to select which of the data signals DATA#0 to DATA#2 based on the values of the skew detection data is incorporated in the timing detecting circuit 77.

The delay times of the delay circuits 61 to 63 of the variable delay circuit 23 and the delay circuit 71 to 73 of the skew detecting circuit 25 in the exemplary embodiment 4 are "substantially" the same. Here, the word "substantial" means ignoring a variation which occurs inevitably upon manufacturing.

Figure 16:
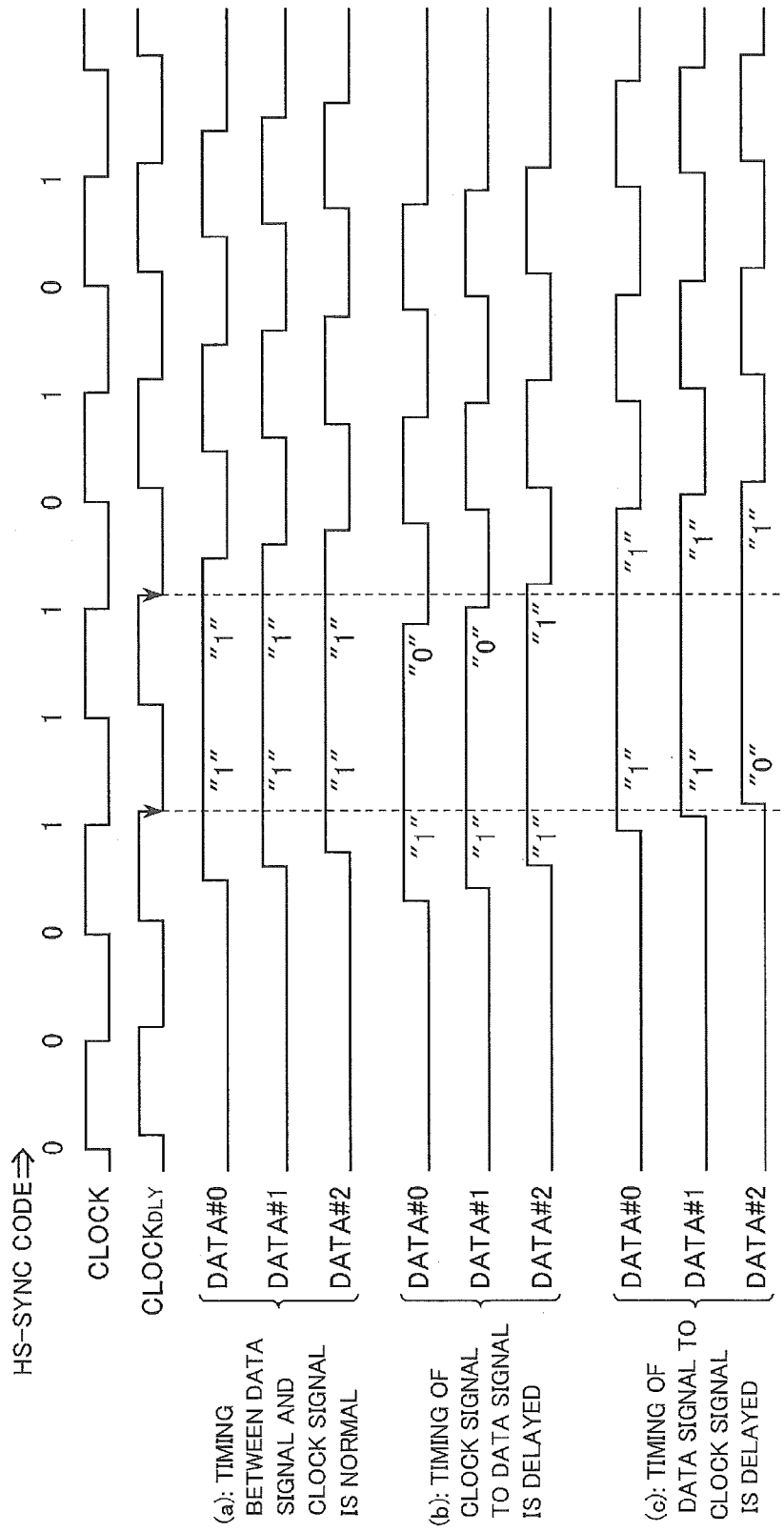
FIG. 16 is a timing chart showing the operation of the skew detecting circuit in an exemplary embodiment 5.

FIG. 16 is a timing chart showing the operation of the skew detecting circuit 25 in the exemplary embodiment 4. As shown in (a) of FIG. 16, when the timing between the data signal DATA and the clock signal CLOCK is normal, the first of "1" of the data sequence of "01110" transmitted by each of the data signal DATA#0 to DATA#2 is latched in synchronization with the front-side falling edge of the delayed clock signal $CLOCK_{DLY}$ and the third of "1" thereof is latched in synchronization with the rear-side falling edge. As a result, all the values of the skew detection data are "1". In this case, the delay control signal $S_{CTRL}$ which is sent from the skew detecting circuit 25 to the variable delay circuit 23 is generated to select the data signal DATA#1 having an intermediate delay, according to the skew detection data. Through such an operation, the margin of the operation timing of the D-type flip-flops 51 and 52 of the latch circuit 24 can be made large.

Also, as shown in (b) of FIG. 16, when a skew occurs to delay the clock signal CLOCK to the data signal DATA, the values of the skew detection data are "0" which are obtained by latching the data signals (data signals DATA#0 and DATA#1 in (b) of FIG. 16) of the data signals DATA#0 to DATA#2, which have a relatively small delay time from the data signal DATA, in synchronization with the rear-side falling edge of the delayed clock signal $CLOCK_{DLY}$. In this case, the delay control signal $S_{CTRL}$ which is sent from the skew detecting circuit 25 to the variable delay circuit 23 is generated to select the data signal DATA#2 with a relatively large delay time from the data signal DATA according to the skew detection data. Through such an operation, the margin of the operation timing of the D-type flip-flops 51 and 52 of the latch circuit 24 can be made large.

Moreover, as shown in (c) of FIG. 16, when a skew occurs to delay the data signal DATA to the clock signal CLOCK, the values of the skew detection data are "0" which are obtained by latching the data signal (the data signal DATA#2 in (c) of FIG. 16) with a relatively large delay time from the data signal DATA, in synchronization with the front-side falling edge thereof. In this case, the delay control signal $S_{CTRL}$ which is sent from the skew detecting circuit 25 to the variable delay circuit 23 is generated to select the data signal DATA#0 with a relatively small delay time from the data signal DATA, according to the skew detection data. Through such an operation, the margin of the operation timing of the D-type flip-flops 51 and 52 of the latch circuit 24 can be made large.

In any case, in the present exemplary embodiment, the delay control signal $S_{CTRL}$ is generated according to the skew detection data which is obtained by latching the data sequence of "01110" transmitted by the data signal DATA#0 to DATA#2 in synchronization with the falling edge of the delayed clock signal $CLOCK_{DLY}$. The selecting circuit 63 of the variable delay circuit 23 is controlled in response to the delay control signal $S_{CTRL}$. Thus, a relative delay between the delay-adjusted data signal $DATA_{ADJ}$ and the delay-adjusted clock signal $CLOCK_{ADJ}$ is adjusted in an appropriate range so that a skew between the delay-adjusted data signal $DATA_{ADJ}$ and the delay-adjusted clock signal $CLOCK_{ADJ}$ can be made small.

Exemplary Embodiment 5

Figure 17:
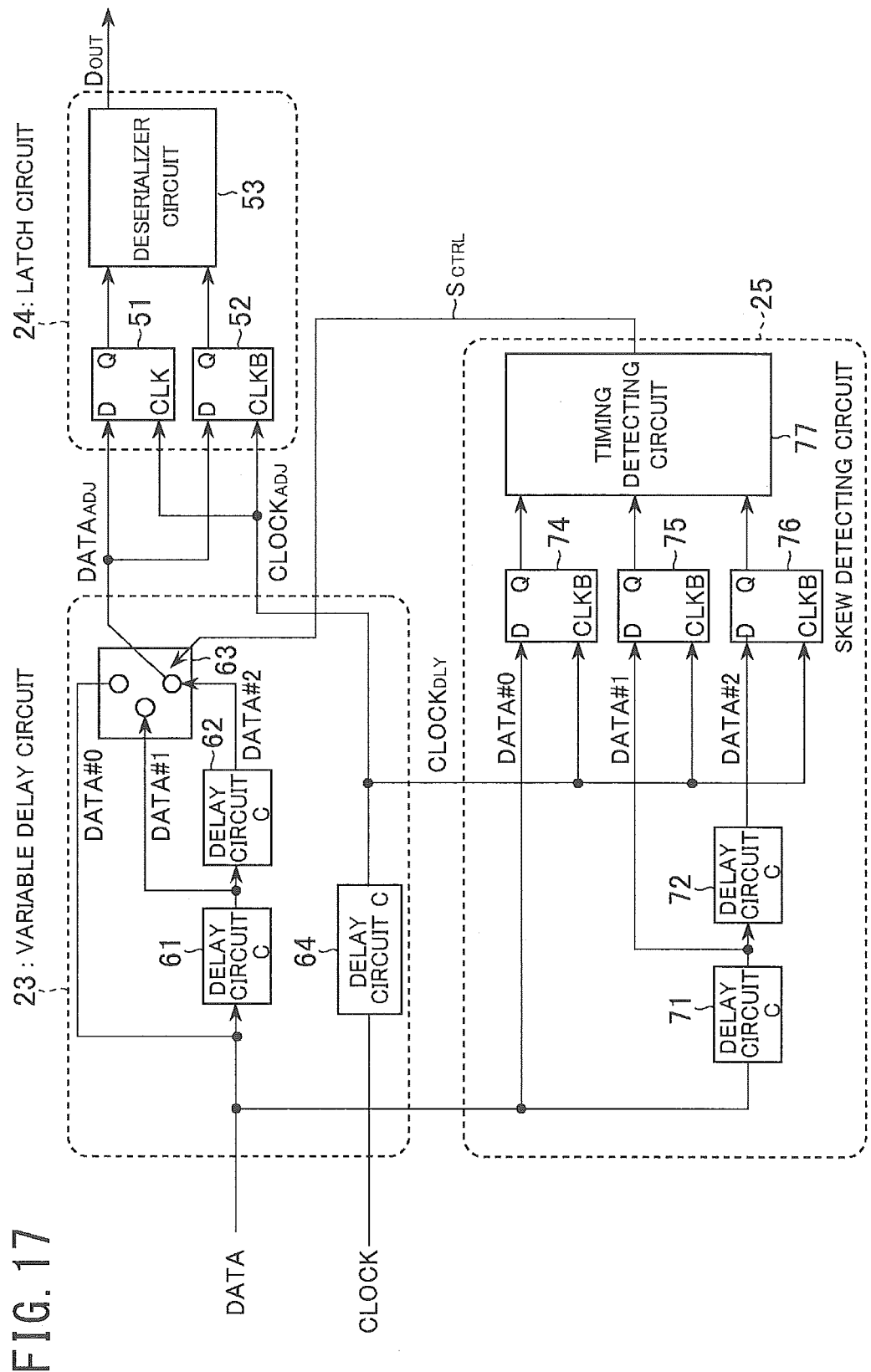
FIG. 17 is a block diagram showing the configuration of the variable delay circuit, the latch circuit and the skew detecting circuit in the exemplary embodiment 5.

FIG. 17 is a block diagram showing the configuration of the variable delay circuit 23, the latch circuit 24 and the skew detecting circuit 25 in an exemplary embodiment 5. The circuit configuration shown in FIG. 17 is a specific example of the variable delay circuit 23, the latch circuit 24 and the skew detecting circuit 25 shown in FIG. 10.

The circuit configuration in the exemplary embodiment 5 shown in FIG. 17 is similar to the circuit configuration of the exemplary embodiment 4 shown in FIG. 15. A difference point is in that the delay circuit 73 is removed from the skew detecting circuit 25 and the delayed clock signal $CLOCK_{DLY}$ is supplied to the skew detecting circuit 25 from the variable delay circuit 23 in the circuit configuration of the exemplary embodiment 5. The delay-adjusted clock signal $CLOCK_{ADJ}$ which is outputted from the delay circuit 64 of the variable delay circuit 23 is used as the delayed clock signal $CLOCK_{DLY}$ which is supplied to the skew detecting circuit 25. The delayed clock signal $CLOCK_{DLY}$ which is supplied to the skew detecting circuit 25 is supplied to the D-type flip-flops 74 to 76.

According to the circuit configuration of the exemplary embodiment 5 shown in FIG. 17, the number of delay circuits can be decreased compared with the circuit configuration of the exemplary embodiment 4. It should be noted that the operation of the variable delay circuit 23, the latch circuit 24 and the skew detecting circuit 25 in the exemplary embodiment 5 is the same as the exemplary embodiment 4 and the description is omitted.

Exemplary Embodiment 6

Figure 18:
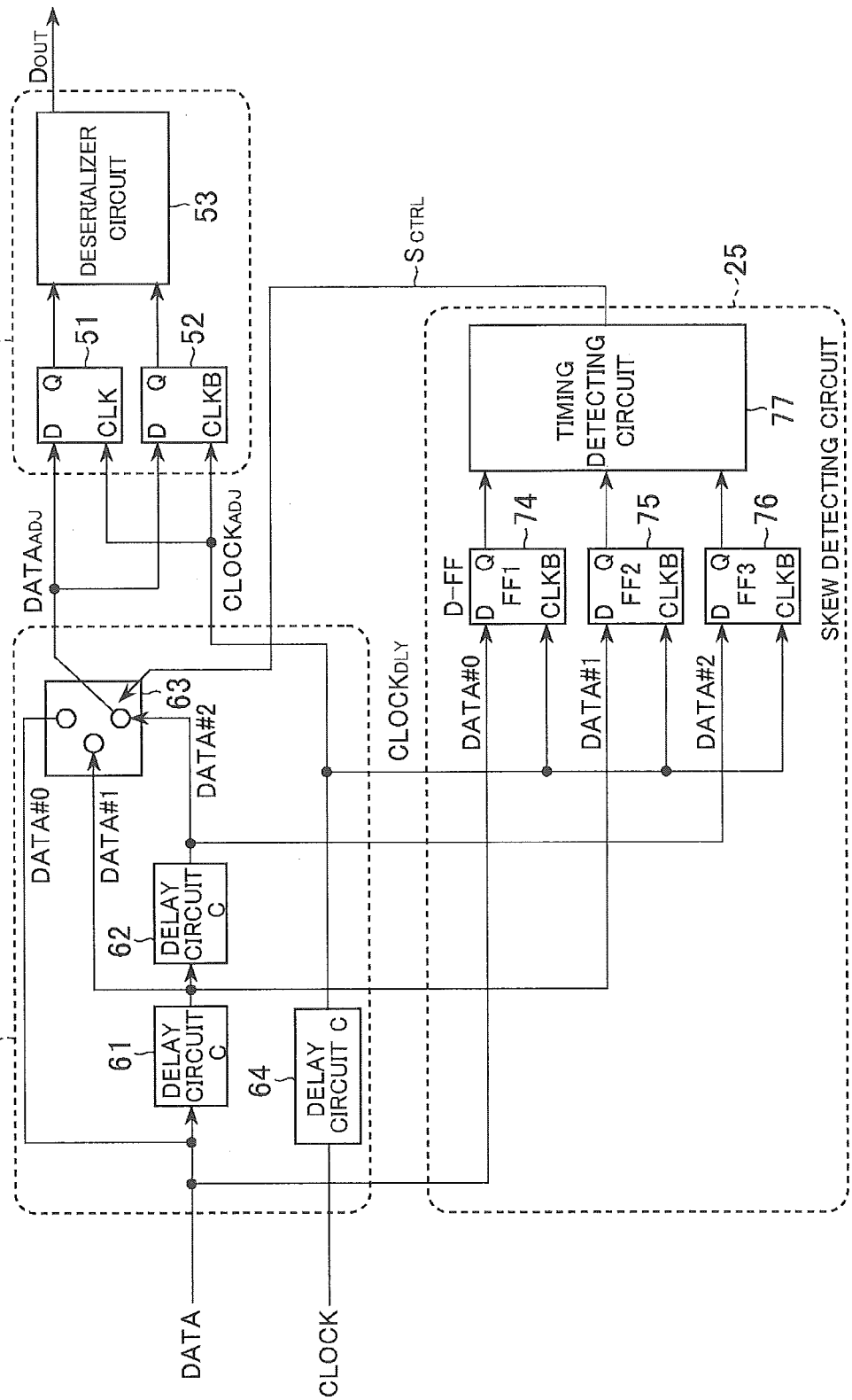
FIG. 18 is a block diagram showing the configuration of the variable delay circuit, the latch circuit and the skew detecting circuit in an exemplary embodiment 6.

FIG. 18 is a block diagram showing the configuration of the variable delay circuit 23, the latch circuit 24 and the skew detecting circuit 25 in an exemplary embodiment 6. The circuit configuration shown in FIG. 18 is a specific example of the variable delay circuit 23, the latch circuit 24 and the skew detecting circuit 25 shown in FIG. 8.

The circuit configuration in the exemplary embodiment 6 shown in FIG. 18 is similar to the circuit configuration in the exemplary embodiment 5 shown in FIG. 17. A difference point is in that the delay circuits 71 and 72 are removed from the skew detecting circuit 25 in the circuit configuration of the exemplary embodiment 6 and the data signals DATA#0 to DATA#2 are supplied to the skew detecting circuit 25 from the variable delay circuit 23. The data signal DATA#1 which is outputted from the delay circuit 61 is supplied to the D-type flip-flop 75 of the skew detecting circuit 25 in addition to the selecting circuit 63. Also, the data signal DATA#2 which is outputted from the delay circuit 62 is supplied to the D-type flip-flop 76 of the skew detecting circuit 25 in addition to the selecting circuit 63. Here, in the exemplary embodiment 6, note that the data signal DATA is used just as it is as the data signal DATA#0.

According to the circuit configuration of the exemplary embodiment 6 shown in FIG. 18, the number of delay circuits can be further decreased compared with the circuit configuration of the exemplary embodiment 5. It should be noted that the operation of the variable delay circuit 23, the latch circuit 24 and the skew detecting circuit 25 in the exemplary embodiment 6 is the same as that of the exemplary embodiment 5, and a further description is omitted.

Exemplary Embodiment 7

Figure 19:
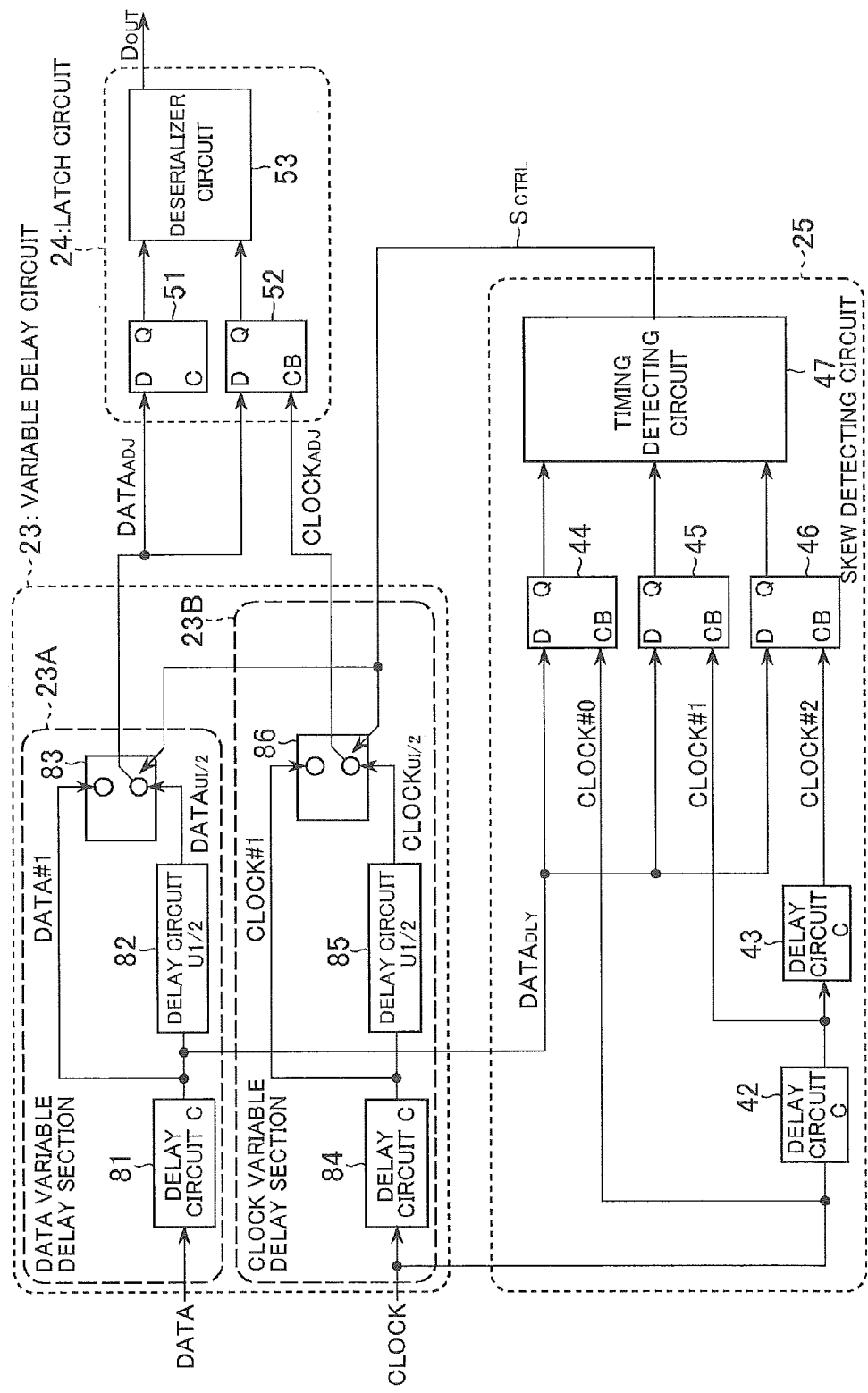
FIG. 19 is a block diagram showing the configuration of the variable delay circuit, the latch circuit and the skew detecting circuit in an exemplary embodiment 7.

FIG. 19 is a block diagram showing the configuration of the variable delay circuit 23, the latch circuit 24 and the skew detecting circuit 25 in an exemplary embodiment 7. The circuit configuration shown in FIG. 19 is a specific example of the variable delay circuit 23, the latch circuit 24 and the skew detecting circuit 25 which are shown in FIG. 9.

In the exemplary embodiment 7, the variable delay circuit 23 is composed of a data variable delay section 23A and a clock variable delay section 23B. The data variable delay section 23A is a circuit section which generates the delay-adjusted data signal $DATA_{ADJ}$ as a signal obtained by delaying the data signal DATA in response to the delay control signal $S_{CTRL}$ which is supplied from the skew detecting circuit 25. In detail, the data variable delay section 23A is composed of delay circuits 81 and 82 and a selecting circuit 83. The delay circuit 81 generates the data signal DATA#1 by delaying the data signal DATA. The delay circuit 82 generates the data signal DATAUI/2 by delaying the data signal DATA#1. The selecting circuit 83 selects either of the data signal DATA#1 and the data signal DATAUI/2 in response to the delay control signal $S_{CTRL}$ and outputs the selected signal as the delay-adjusted data signal $DATA_{ADJ}$. The data signal DATA#1 which is generated by the delay circuit 81 is supplied to the skew detecting circuit 25 as the delayed data signal $DATA_{DLY}$.

On the other hand, the clock variable delay section 23B is a circuit section which generates the delay-adjusted clock signal CLOCK$_{ADJ}$ as a signal obtained by delaying the clock signal CLOCK in response to the delay control signal S$_{CTRL}$ which is supplied from the skew detecting circuit 25. In detail, the clock variable delay section 23B is composed of delay circuits 84 and 85 and a selecting circuit 86. The delay circuit 84 generates the clock signal CLOCK#1 by delaying the clock signal CLOCK. The delay circuit 85 generates the clock signal CLOCKUI/2 by delaying the clock signal CLOCK#1. The selecting circuit 86 selects either of the clock signal CLOCK#1 and the clock signal CLOCKUI/2 in response to the delay control signal S$_{CTRL}$ and outputs the selected signal as the delay-adjusted clock signal CLOCK$_{ADJ}$.

The configuration of the latch circuit 24 and the skew detecting circuit 25 in the exemplary embodiment 7 is the same as that of the exemplary embodiment 5 (see FIG. 13). The latch circuit 24 is composed of the D-type flip-flops 51 and 52 and the deserializer circuit 53, and the skew detecting circuit 25 is composed of the delay circuits 42 and 43, the D-type flip-flops 44 to 46 and the timing detecting circuit 47. In the present exemplary example, the clock signal CLOCK which is supplied to the skew detecting circuit 25 is used just as it is as the clock signal CLOCK#0, and the clock signals CLOCK#1 and CLOCK#2 are generated by the delay circuits 42 and 43.

One feature of the present exemplary embodiment is in the setting of the delay time of each delay circuit which is contained in the variable delay circuit 23. The delay times of the delay circuits 81 and 84 of the variable delay circuit 23 and the delay times of the delay circuits 42 and 43 of the skew detecting circuit 25 are set to substantially the same delay time. The delay times of the delay circuits 81, 84, 42, and 43 are referred to as a delay time C, hereinafter. On the other hand, the delay times of the delay circuits 82 and 85 is set longer than the delay time C of the delay circuits 81, 84, 42 and 43.

The delay times of the delay circuits 82 and 85 of the variable delay circuit 23 are set to be "substantially" coincident with UI/2 in the present exemplary embodiment. Here, "UI" has a time of a half of the period of the clock signal CLOCK which is prescribed in the specification of this transmission and reception system. Also, the word "substantially" means ignoring a deviation which occurs inevitably upon manufacturing. In other words, a difference in the delay time between the data signals DATA#1 and DATAUI/2 which are selected by the selecting circuit 83 of data variable delay section 23A is UI/2, and a difference in the delay time between the clock signals CLOCK#1 and CLOCKUI/2 which are selected by the selecting circuit 86 of the clock variable delay section 23B is UI/2. According to such a setting, even if the data signal DATA and the clock signal CLOCK are in any delay relation, the variable delay circuit 23 can set the timings of the edges in the data signal DATA and the clock signal CLOCK to a range within a time difference which has been prescribed as a default in the specification.

Figure 20:
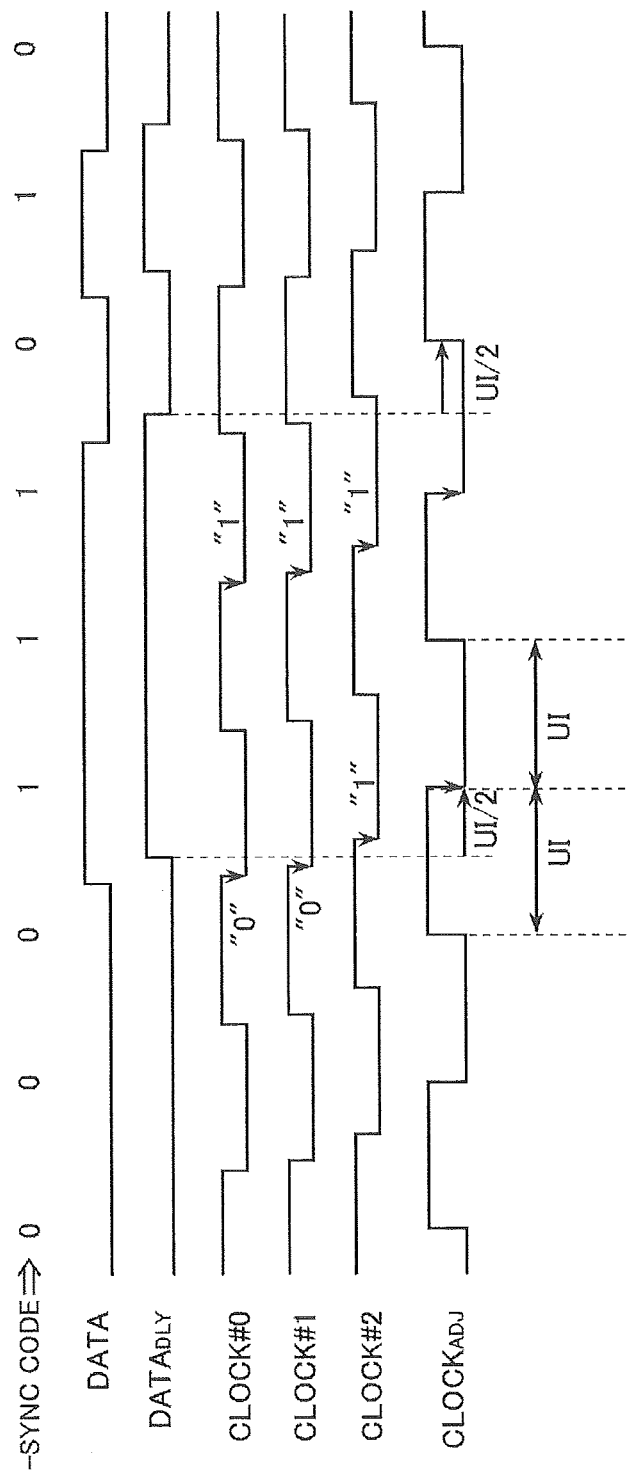
FIG. 20 is a timing chart showing the operation of the skew detecting circuit in the exemplary embodiment 7.

FIG. 20 is a timing chart showing the operation of the skew detecting circuit 25 in an exemplary embodiment 7. FIG. 20 shows the operation of the skew detecting circuit 25 when a skew occurs to delay the data signal DATA to the clock signal CLOCK (that is, when the phase of the clock signal CLOCK is lead to the data signal DATA). In this case, the skew detection data are "0" which are obtained by latching in synchronization with the front-side falling edge of the multi-phase clock signal with a lead phase (the clock signals CLOCK#0 and CLOCK#1 in FIG. 20). In this case, the delay control signal S$_{CTRL}$ which is sent from the skew detecting circuit 25 to the variable delay circuit 23 is generated such that the selecting circuit 83 selects the data signal DATA#1 and the selecting circuit 86 selects the clock signal CLOCKUI/2. Through such an operation, the margin of the operation timing of the D-type flip-flops 51 and 52 of the latch circuit 24 can be made large.

In the same way, when a skew occurs to delay the clock signal CLOCK to the data signal DATA, such that the selecting circuit 83 selects the data signal DATAUI/2 and the selecting circuit 86 selects the clock signal CLOCK#1. The delay control signal S$_{CTRL}$ which is sent from the skew detecting circuit 25 to the variable delay circuit 23 is generated. Through such an operation, the margin of the operation timing of the D-type flip-flops 51 and 52 of the latch circuit 24 can be made large.

Moreover, when it is determined that a skew does not occur from the skew detection data (for example, when all the values of the skew detection data are "1"), the delay control signal S$_{CTRL}$ which is sent from the skew detecting circuit 25 to the variable delay circuit 23 is generated such that the selecting circuit 83 selects the data signal DATA#1 and the selecting circuit 86 selects the clock signal CLOCK#1. When the skew is determined not to occur, the delay time which is identical with the data signal DATA and the clock signal CLOCK is given, and the delay-adjusted data signal DATA$_{ADJ}$ and the delay-adjusted clock signal CLOCK$_{ADJ}$ are generated.

In any case, in the present exemplary embodiment, the delay control signal S$_{CTRL}$ is generated according to the skew detection data which is obtained by latching the data sequence of "01110" transmitted by the delayed data signal DATA$_{DLY}$ in synchronization with the falling edges of the clock signals CLOCK#0 to CLOCK#2 of the multi-phase clock signal. The selecting circuits 83 and 86 of the variable delay circuit 23 are controlled in response to the delay control signal S$_{CTRL}$. Thus, a relative delay between the delay-adjusted data signal DATA$_{ADJ}$ and the delay-adjusted clock signal CLOCK$_{ADJ}$ is adjusted to an appropriate range. The skew between the delay-adjusted data signal DATA$_{ADJ}$ and the delay-adjusted clock signal CLOCK$_{ADJ}$ can be made small.

In the present exemplary embodiment, because the delay circuits 82 and 85 are composed of delay elements such as an inverter, the delay circuits 82 and 85 undergo influence of a deviation of the temperature, the power supply voltage, and the threshold voltage of a MOS transistor. Therefore, the delay time of each of the delay circuits 82 and 85 actually changes and shifts from the delay time UI/2. Also, an actual period (the frequency) of the clock signal CLOCK can also change. In order to prevent the influence of such a change, it is desirable to adjust the delay time UI/2 of the delay circuits 82 and 85 according to the period of the clock signal CLOCK.

FIG. 21A is a circuit diagram showing an example of the configuration of the delay circuits 82 and 85 to set the delay time UI/2 of the delay circuit 82 according to the period UI of the clock signal CLOCK used actually. Below, the configuration of the delay circuit 82 which generates the data signal DATAUI/2 by delaying the data signal DATA#1 will be described. However, the configuration of the delay circuit 85 is also identical although the supplied signal is different. When the configuration of FIG. 21A is applied to the delay circuit 85, the clock signal CLOCK#1 is supplied instead of the data signal DATA#1 and the clock signal CLOCKUI/2 is outputted instead of the data signal DATAUI/2.

In the configuration of FIG. 21A, the delay circuit 82 is composed of a plurality of delay circuits $91_1$ to $91_{10}$, a plurality of D-type flip-flops $92_1$ to $92_{10}$, and a timing detecting circuit $93a$, a delay selecting circuit $93b$ and delay circuits $94_1$ to $94_7$.

Each of the delay circuits $91_1$ to $91_{10}$ has the delay time C and operates as a first sequential delay section which generates sequential delay signals DELAY1 to DELAY10 (first sequential delay signals) with different delay times from the clock signal CLOCK. In detail, the delay circuit $91_1$ generates the sequential delay signal DELAY1 by delaying the clock signal CLOCK by the delay time C. The delay circuit $91_2$ generates the sequential delay signal DELAY2 by delaying the sequential delay signal DELAY1 by the delay time C. Hereinafter, in the same way, the delay circuit $91_j$ generates the sequential delay signal DELAYj by delaying the sequential delay signal DELAY(j−1). Here, j is an integer equal to or more than 2 and equal to or less than 10.

The D-type flip-flops $92_1$ to $92_{10}$ function as a delay control data acquisition section which latches the clock signal CLOCK in synchronization with each of the sequential delay signals DELAY1 to DELAY10 and outputs a value (high or low level) of the latched clock signal CLOCK from each data output Q as delay control data.

The delay circuits $94_1$ to $94_7$ have the delay time C and are connected in series. The delay circuits $94_1$ to $94_7$ operates as a second sequential delay section which generates sequential delay signals (second sequential delay signals) with different delay times from the data signal DATA#1. In detail, the data signal DATA#1 is supplied to the input of a first delay circuit $94_1$ and the output of the first delay circuit $94_1$ is connected with the input of a second delay circuit $94_2$. In the same way, the output of a $(k-1)^{th}$ delay circuit $94_{k-1}$ is connected with the input of a $k^{th}$ delay circuit $94_k$. Here, k is an integer from 2 to 7.

The timing detecting circuit $93a$ determines the most suitable sequential delay signal for the data signal DATAUI/2 of the sequential delay signals outputted from the delay circuits 941 to $94_7$ according to the delay control data outputted from the D-type flip-flops $92_1$ to $92_{10}$. The logic to select the sequential delay signal outputted from any of the delay circuits $94_1$ to $94_7$ is incorporated in the timing detecting circuit $93a$ based on the values outputted from the D-type flip-flops $92_1$ to $92_{10}$. The delay selecting circuit $93b$ selects the sequential delay signal determined by the timing detecting circuit $93a$ from among the sequential delay signals outputted from the delay circuits $94_1$ to $94_7$ and outputs as the data signal DATAUI/2.

Figure 22A:
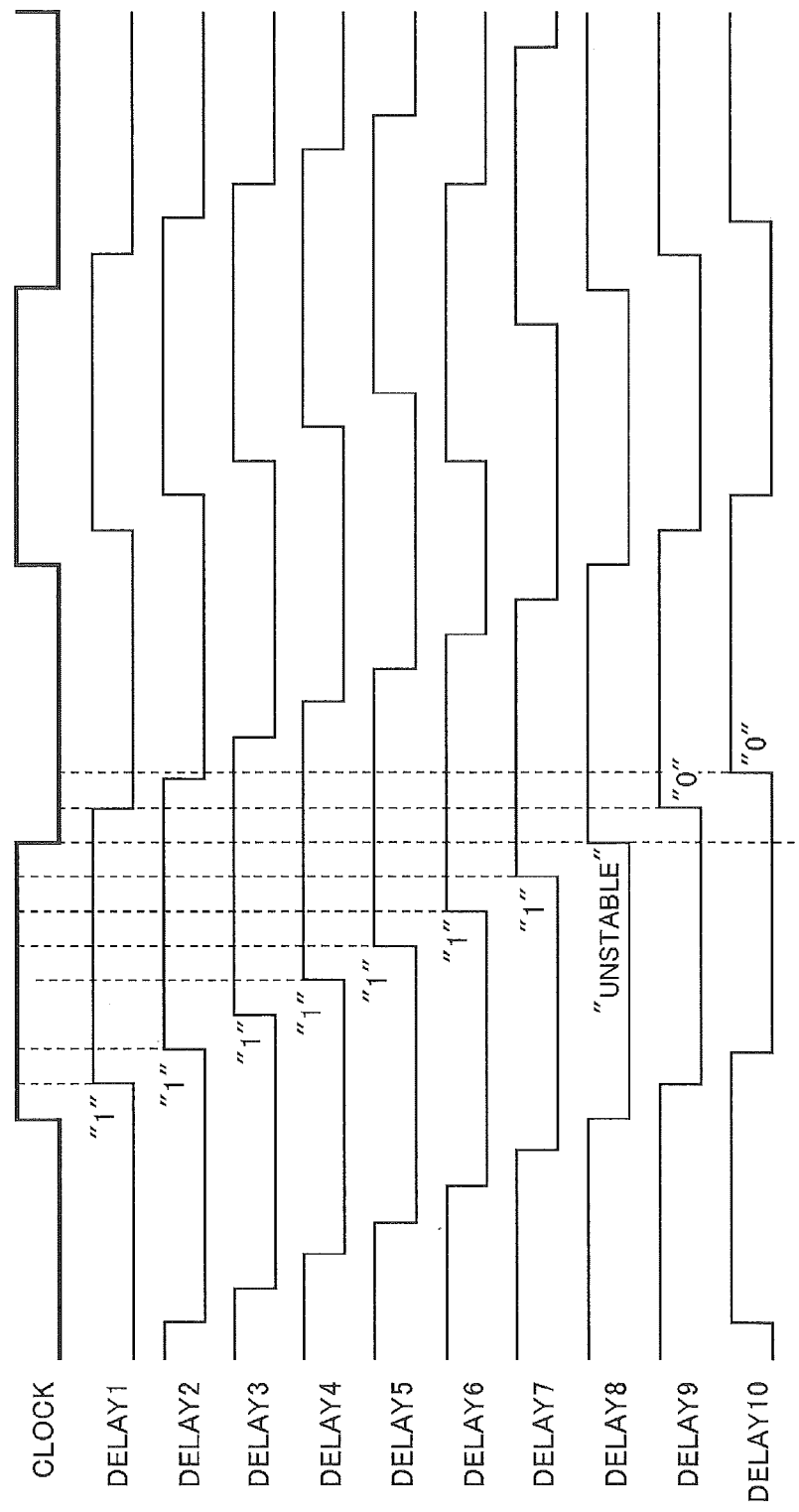
FIG. 22A is a timing chart showing the operation of the delay circuit of FIG. 21A.

FIG. 22A is a timing chart showing an operation of the delay circuit 82 having the configuration of FIG. 21A, especially, the operation of the delay selecting circuit 93. FIG. 22A shows the operation when the D-type flip-flops $92_1$ to $92_{10}$ latch the operation the clock signal CLOCK in response to the rising edge of the sequential delay signals DELAY1 to DELAY10. When the D-type flip-flops $92_1$ to $92_{10}$ respectively latch the clock signal CLOCK in synchronization with the sequential delay signals DELAY1 to DELAY10, the values outputted from the D-type flip-flops $92_1$ to $92_{10}$ show a phase relation of of the sequential delay signals DELAY1 to DELAY10 and the clock signal CLOCK. Therefore, it is possible to determine the period of the clock signal CLOCK in units of delay time C from the values outputted from the D-type flip-flops $92_1$ to $92_{10}$.

For example, as shown in FIG. 22A, when the values are "1" which are obtained by latching the clock signal CLOCK in synchronization with the sequential delay signals DELAY1 to DELAY7, the sequential delay signal DELAY8 is unstable, and the values are "0" which are obtained by latching the clock signal CLOCK in synchronization with the sequential delay signals DELAY9 and DELAY10, it is regarded as the period DI of the clock signal CLOCK almost coincides with the delay time 8C from the clock signal CLOCK to the sequential delay signal DELAY8. In such a case, by selecting the output signal of the delay circuit 944 having the delay time of 4C from the clock signal CLOCK by the delay selecting circuit 93, the data signal DATAUI/2 delayed by almost a half of the period DI of the clock signal CLOCK from the data signal DATA#1 can be outputted.

FIG. 21A shows the circuit configuration which contains the 10 delay circuits 91 and the 10 D-type flip-flops 92 and it is possible to change the number of delay circuits 91 or D-type flip-flops 92 appropriately. In the same way, the number of the delay circuits 94 can be changed appropriately.

Also, note that it is always not necessary that the delay time of the delay circuit 91 and the delay time of the delay circuit 94 are coincident with each other. If the logic of the delay selecting circuit 93 is changed even if the delay time of the delay circuit 91 and the delay time of the delay circuit 94 are different, a signal that a delay time from the data signal DATA#1 is UI/2 or that has a delay time nearest to UI/2 can be selected from among the output signals of from the delay circuits $94_1$ to $94_7$ based on the output signals of the D-type flip-flops $92_1$ to $92_{10}$.

FIG. 21B shows a modification example of the configuration of the delay circuit 82 of FIG. 21A. In the configuration of FIG. 21B, the D-type flip-flops $92_1$ to $92_{10}$ latch the sequential delay signals DELAY1 to DELAY10 in synchronization with the clock signal CLOCK and output the value (high or low level) of the latched delay signal DELAY1 to DELAY10 from the data outputs Q as the delay control data. In this case, by incorporating the logic to determine the sequential delay signal outputted from either of the delay circuits $94_1$ to $94_7$ as the data signal DATAUI/2 in the timing detecting circuit $93a$ according to the delay control data outputted from the D-type flip-flops $92_1$ to $92_{10}$, The sequential delay signal outputted from either of the delay circuits $94_1$ to $94_7$ can be appropriately selected as the data signal DATAUI/2.

FIG. 22B shows the operation of the delay circuit 82 of the configuration of FIG. 21B. FIG. 222 shows an operation when the D-type flip-flops $92_1$ to $92_{10}$ latch the clock signal CLOCK in response to the falling edge of the clock signal CLOCK. Even when adopting the configuration of FIG. 21B, the essential operation is identical with a case to adopt the configuration of FIG. 21A.

It should be noted that the delay circuits $91_1$ to $91_{10}$, the D-type flip-flops $92_1$ to $92_{10}$ and the timing detecting circuit $93a$ may be shared among the delay circuits 82 and 85. In this case, the delay circuits 941 to $94_7$ corresponding to the delay circuit 82 and the delay circuits $94_1$ to $94_7$ corresponding to the delay circuit 85 are provided. The timing detecting circuit $93a$ selects either of the sequential delay signals outputted from the delay circuits $94_1$ to $94_7$ contained in the delay circuit 82 to output as the data signal DATAUI/2, and selects either of the sequential delay signals outputted from the delay circuits $94_1$ to $94_7$ contained in the delay circuit 85 to output as the clock signal CLOCKUI/2.

Figure 23:
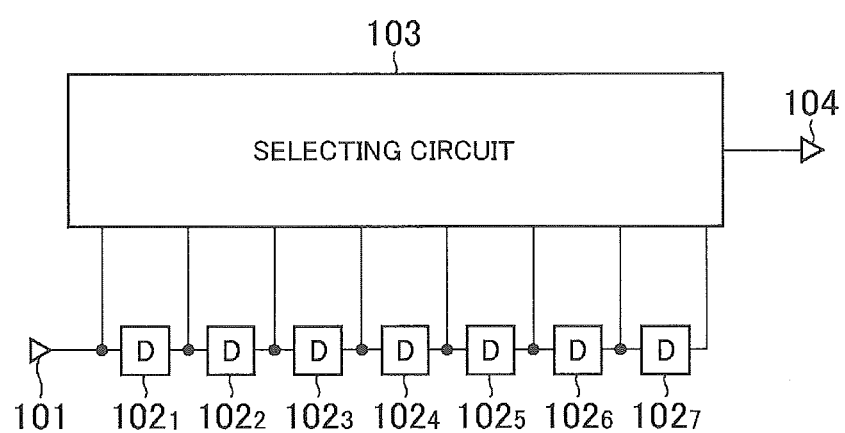
FIG. 23 is a block diagram showing the configuration of the delay circuit with a variable delay time.

In the present exemplary embodiment, the configuration in which the delay time can be adjusted variably may be adopted for the delay circuits 81 and 84 of the variable delay circuit 23 and the delay circuits 42 and 43 (see FIG. 19) of the skew detecting circuit 25. FIG. 23 shows an example of the configuration of the delay circuit that the delay time can be adjusted variably. The delay circuit having the configuration of FIG. 23 is composed of delay elements $102_1$ to $102_7$ connected in series with an input terminal 101 and a selecting circuit 103. The selecting circuit 103 selects the output signal of either of the delay elements $102_1$ to $102_7$ and outputs the selected output signal from an output terminal 104. The operation of the selecting circuit 103 may be set by a register and set such that the output signal of a specific delay circuit 102 is fixedly selected by a metal wiring line. By adopting the configuration of FIG. 23, the delay circuit can be provided in which the delay time is variable based on the setting of the selecting circuit 103.

Also, the configuration shown in FIG. 23 may be adopted for the delay circuits (the delay circuits 31 to 33, 41 to 43, 61 62, 64, and 71 to 73) which are used in either of other exemplary embodiments. The delay time of each delay circuit becomes variably adjustable.

Subsequently, a modification of the transmission and reception system of the present embodiment will be described.

Exemplary Embodiment 8

Figure 24:
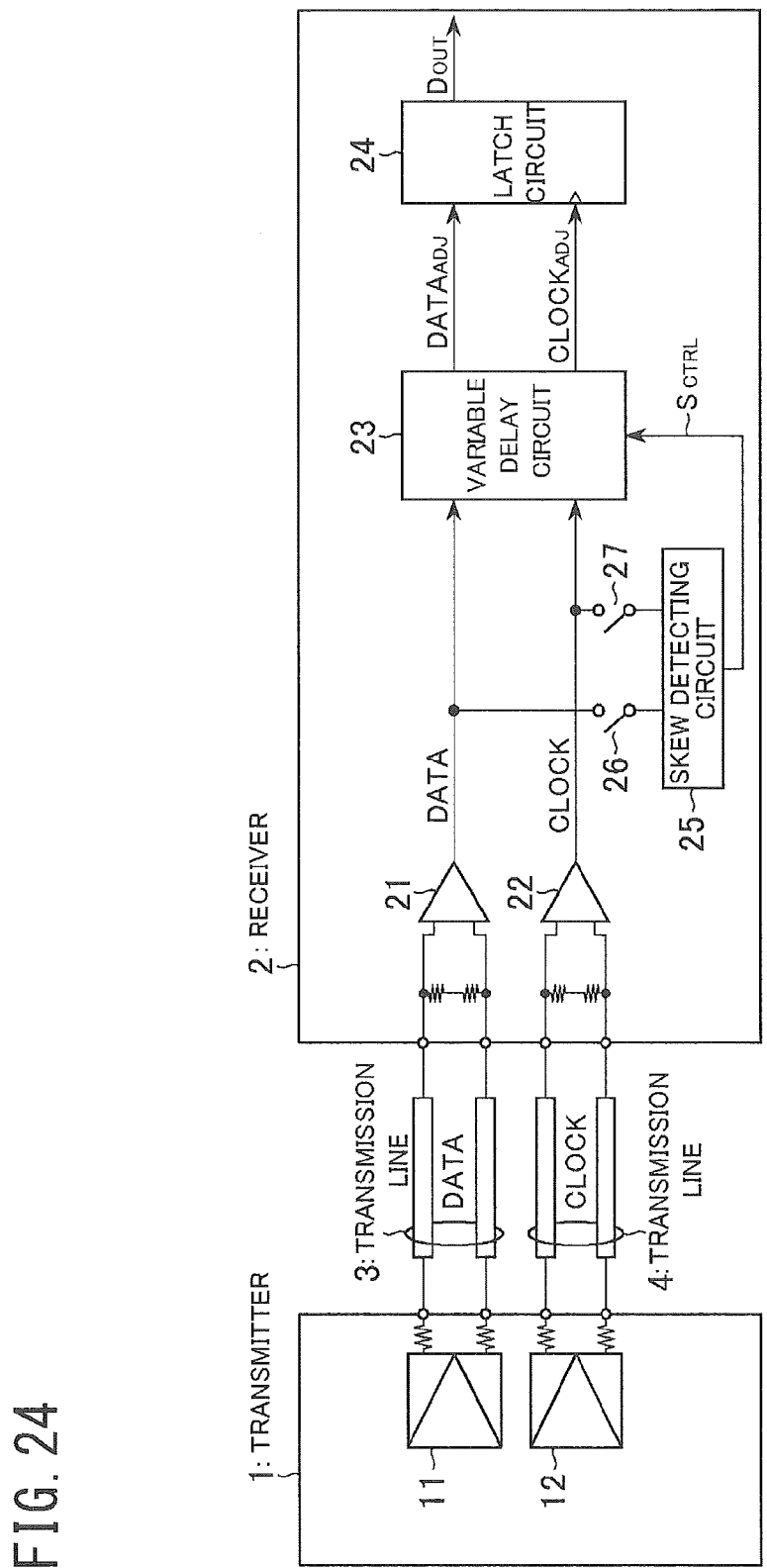
FIG. 24 is a block diagram showing the configuration of the transmission and reception system in an exemplary embodiment 8.

FIG. 24 is a block diagram showing the configuration of the transmission and reception system of an exemplary embodiment 8. In the exemplary embodiment 8, switches 26 and 27 are provided in lines to supply the data signal DATA and the clock signal CLOCK to the skew detecting circuit 25, respectively. The switches 26 and 27 are turned on for a specific period for which the specific data sequence which is used for the generation of the skew detection data is transmitted as the data signal DATA, and are turned off for the other period. When the switches 26 and 27 are turned off, the data signal DATA and the clock signal CLOCK are not supplied to the skew detecting circuit 25. The value of the delay control signal $S_{CTRL}$ outputted from the skew detecting circuit 25 is held for the period for which the switches 26 and 27 are turned off (that is, a period except the specific period).

For example, when the transmission and reception system transmits the data signal DATA and the clock signal CLOCK to the receiver 2 based on the MIPI D-PHY standard, the switches 26, 27 may be turned on in the period for which the HS-SYNC code is transmitted as the data signal DATA, and may be turned off in the other period.

According to such a configuration, in a period except a period for which a skew is detected (i.e. the period for which the skew detection data is generated), the supply of the data signal DATA and the clock signal CLOCK to the skew detecting circuit 25 can be stopped so that the consumed current of the skew detecting circuit 25 can be reduced.

When another data signal (that is, the delayed data signal $DATA_{DLY}$ and the data signals DATA#0 to DATA#(N−1)) is supplied to the skew detecting circuit 25, a switch may be provided for the signal line on which the data signal is supplied to the skew detecting circuit 25. Also, when another clock signal (that is, the delayed clock signal $CLOCK_{DLY}$ and the clock signals CLOCK#0 to CLOCK#(N−1) of the multi-phase clock signal) is supplied to the skew detecting circuit 25, a switch may be provided for the signal line by which the clock signal is supplied to the skew detecting circuit 25.

Figure 25:
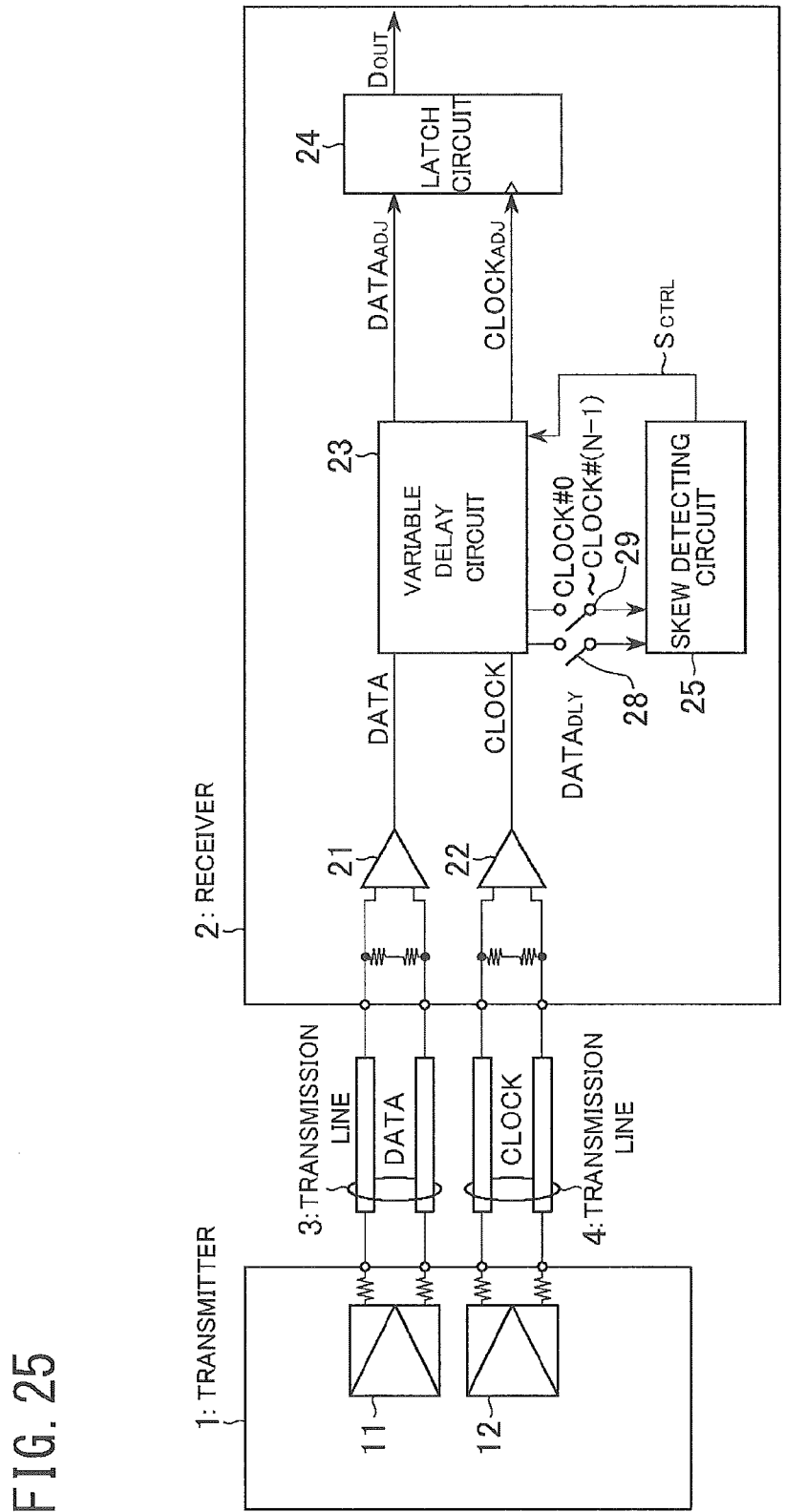
FIG. 25 is a block diagram showing a modification example of the transmission and reception system transformation in the exemplary embodiment 8.

FIG. 25 shows an example of the transmission and reception system having such a configuration. In the configuration of FIG. 25, a switch 28 is disposed for the signal line on which the delayed data signal $DATA_{DLY}$ is supplied from the variable delay circuit 23 to the skew detecting circuit 25. A switch 29 is disposed for the signal line on which the multi-phase clock signal CLOCK#0 to CLOCK#(N−1) is supplied from the variable delay circuit 23 to the skew detecting circuit 25. The switches 28 and 29 are turned on in a specific period containing a period for which a specific data sequence used for the generation of the skew detection data is transmitted as the data signal DATA, and are turned off in another period except the specific period. When the switches 28 and 29 are turned off, the delayed data signal $DATA_{DLY}$ and the multi-phase clock signal CLOCK#0 to CLOCK#(N−1) are not supplied to the skew detecting circuit 25. In the period for which the switches 28 and 29 are turned off (that is, a period except the specific period), the value of the delay control signal $S_{CTRL}$ which is outputted from the skew detecting circuit 25 is held. According to such a configuration, the consumed current of the skew detecting circuit 25 can be reduced in the period except the period for which a skew is detected (i.e. the period for which the skew detection data is generated).

Exemplary Embodiment 9

FIG. 26 is a block diagram showing the configuration of the transmission and reception system in an exemplary embodiment 9. In the exemplary embodiment 9, the plurality of data signals, specifically, the data signals $DATA_{00}$ to $DATA_{04}$ transmitted from the transmitter 1 to the receiver 2 in synchronization with the clock signal CLOCK. In the present exemplary embodiment, the variable delay circuit 23, the latch circuit 24 and the skew detecting circuit 25 are provided in the receiver 2 for each of the data signals $DATA_{00}$ to $DATA_{04}$.

In detail, the transmitter 1 is composed of transmission-side amplifiers $11_0$ to $11_3$, and 12 and the receiver 2 is composed of the receiver-side amplifiers $21_0$ to $21_3$, and 22. The transmission-side amplifiers $11_0$ to $11_3$ of the transmitter 1 transmit the data signals $DATA_{00}$ to $DATA_{03}$ to the receiver-side amplifiers $21_0$ to $22_3$ of the receiver 2 through the transmission lines $3_0$ to $3_3$, respectively. Also, the transmission-side amplifier 12 of the transmitter 1 transmits the clock signal CLOCK to the receiver-side amplifier 22 of the receiver 2 through the transmission line 4. In the transmission lines $3_0$ to $3_3$ and 4, the data signals $DATA_{00}$ to $DATA_{03}$ and the clock signal CLOCK are transmitted as differential small amplitude signals. The receiver-side amplifiers $21_0$ to $21_3$, and 22 convert the data signals $DATA_{00}$ to $DATA_{03}$ transmitted as the differential small amplitude signals, and the clock signal CLOCK into single end signals, respectively. That is, the data signals $DATA_{00}$ to $DATA_{03}$ and the clock signal CLOCK which are outputted from the receiver-side amplifiers $21_0$ to $21_3$, and 22, are the single end signals.

Moreover, the receiver 2 is composed of the variable delay circuits $23_0$ to $23_3$, the latch circuits $24_0$ to $24_3$ and the skew detecting circuits $25_0$ to $25_3$. The variable delay circuits $23_0$ to $23_3$ are circuits which control or adjust relative delays between the data signals $DATA_{00}$ to $DATA_{03}$ and the clock signal CLOCK, respectively. The latch circuits $24_0$ to $24_3$ latch the delay-adjusted clock signals $CLOCK_{ADJ}$ which are supplied from the variable delay circuits $23_0$ to $23_3$ in synchronization with and the data signal $DATA_{ADJ}$ to generate the output data signals $D_{OUT0}$ to $D_{OUT3}$. The skew detecting circuits $25_0$ to $25_3$ detect skews between the data signals $DATA_{00}$ to $DATA_{03}$ and the clock signal CLOCK to generate delay control signals $S_{CTRL0}$ to $S_{CTRL3}$ according to the detected skews, respectively. The generated delay control signals $S_{CTRL0}$ to $S_{CTRL3}$ are sent to the variable delay circuits $23_0$ to $23_3$. In the variable delay circuits $23_0$ to $23_3$, relative delays between the data signals $DATA_{00}$ to $DATA_{03}$ and the clock signal CLOCK are controlled or adjusted in response to the delay control signals $S_{CTRL0}$ to $S_{CTRL3}$ generated according to the detected skews, respectively. The configuration of the variable delay circuits $23_0$ to $23_3$, the latch circuits $24_0$ to $24_3$, and the skew detecting circuits $25_0$ to $25_3$ is as described in the above-mentioned exemplary embodiments.

In the present exemplary embodiment, with respect to each of the plurality of data signals $DATA_{00}$ to $DATA_{03}$, the skew with the clock signal CLOCK can be canceled individually.

The specific embodiments and exemplary embodiments of the present invention have been described. However, the present invention should not be interpreted as being limited to the above-mentioned embodiments and the exemplary embodiments. It is apparent to a person in the art that the present invention can be implemented in various forms containing modifications.

What is claimed is:

1. A receiver comprising:
a first receiving section configured to receive an external clock signal and output a clock signal;
a second receiving section configured to receive an external data signal and output a data signal;
a variable delay circuit configured to generate a delay-adjusted clock signal and a delay-adjusted data signal by delaying at least one of the clock signal and the data signal;
a latch circuit section configured to latch the delay-adjusted data signal in synchronization with the delay-adjusted clock signal to output an output data signal; and
a skew detecting circuit configured to latch a specific data sequence transmitted as the data signal or the delayed data signal obtained by delaying the data signal, in synchronization with first to $N^{th}$ clock signals (N is an integer equal to or more than 2) with different delay times to the clock signal to generate skew detection data, and control the variable delay circuit to adjust a delay time of the at least one signal based on the skew detection data.

2. The receiver according to claim 1, wherein the skew detecting circuit generates a control signal to control the variable delay circuit to adjust the delay time of the at least one of the clock signal and the data signal based on the skew detection data,
wherein the variable delay circuit generates the first to $N^{th}$ clock signals and selects either of the first to $N^{th}$ clock signals based on the control signal, to output as the delay-adjusted clock signal, and
wherein the the first to $N^{th}$ clock signals are supplied from the variable delay circuit to the skew detecting circuit.

3. The receiver according to claim 2, wherein the variable delay circuit generates the delayed data signal by delaying the data signal for a predetermined time period and the delay-adjusted data signal from the delayed data signal,
wherein the delayed data signal is supplied from the variable delay circuit to the skew detecting circuit, and
wherein the skew detecting circuit generates the skew detection data by latching the specific data sequence transmitted with the delayed data signal in synchronization with the first to $N^{th}$ clock signals.

4. The receiver according to claim 1, wherein the skew detecting circuit generates and outputs the control signal to control the delay time of the at least one of the clock signal and the data signal to the variable delay circuit based on the skew detection data,
wherein the variable delay circuit comprises:
a data variable delay section configured to generate the delay-adjusted data signal by delaying the data signal; and
a clock variable delay section configured to generate the delay-adjusted clock signal by delaying the clock signal, wherein the data variable delay section comprises:

a first delay circuit configured to output a first delay signal by delaying the data signal by a first delay time;
a second delay circuit configured to output a second delay signal by delaying the first delay signal by a second delay time; and
a first selecting circuit configured to select either one of the first delay signal and the second delay signal as the delay-adjusted data signal based on the control signal,
wherein the clock variable delay section comprises:
a third delay circuit configured to output a third delay signal by delaying the clock signal by the first delay time;
a fourth delay circuit configured to output a fourth delay signal by delaying the clock signal by the second delay time; and
a second selecting circuit configured to select either of the third delay signal and the fourth delay signal as the delay-adjusted clock signal based on the control signal, and
wherein the second delay time substantively coincides with a half of one period of the clock signal.

5. The receiver according to claim 4, further comprising:
a first sequential delay section configured to generate a plurality of first sequential delay signals with different delay times to the clock signal from the clock signal;
a delay control data acquiring section configured to acquire a delay control data by latching the clock signal in synchronization with the plurality of first sequential delay signals, or the plurality of first sequential delay signals in synchronization with the clock signal;
a timing detecting circuit; and
a first delay selecting circuit,
wherein the second delay circuit comprises a second sequential delay section configured to generate a plurality of second sequential delay signals with different delay times to the first delay signal from the first delay signal,
wherein the timing detecting circuit determines either of the plurality of second sequential delay signals as the second delay signal in response to the delay control data, and
wherein the first delay selecting circuit outputs either of the plurality of second sequential delay signals as the second delay signal based on the determination by the timing detecting circuit.

6. The receiver according to claim 5, wherein the fourth the delay circuit comprises:
a third sequential delay section configured to generate a plurality of third sequential delay signals with different delay times to the third delay signal from the third delay signal; and
a second delay selecting circuit,
wherein the timing detecting circuit determines either of the plurality of third sequential delay signals as the third delay signal in response to the delay control data, and
wherein the second delay selecting circuit outputs either of the plurality of third sequential delay signals as the third delay signal based on the determination by the timing detecting circuit.

7. The receiver according to claim 1, wherein the transmission of the external clock signal and the external data signal to the receiver is carried out based on the MIPI (Mobile Industry Processor Interface) D-PHY standard and the specific data sequence is a data sequence which is contained in the HY-SYNC code.

8. The receiver according to claim 1, further comprising:
a first signal line connected to the skew detecting circuit to supply the data signal or the delayed data signal;
a second signal line connected to the skew detecting circuit to supply the clock signal;
a first switch provided in the first signal line; and
a second switch provided in the second signal line,
wherein the skew detecting circuit is configured to generate and output the control signal to control the delay time of the at least one signal, to the variable delay circuit based on the skew detection data,
wherein the first switch and the second switch supplies the data signal or the delayed data signal to the skew detecting circuit and the clock signal to the skew detecting circuit in a specific period which contains a period for which the specific data sequence is transmitted,
wherein the first switch and the second switch block off supply of the data signal or the delayed data signal to the skew detecting circuit and supply of the clock signal to the skew detecting circuit in a period except the specific period, and
wherein the skew detecting circuit holds the value of the control signal in the period except the specific period.

9. The receiver according to claim 1, further comprising:
a first signal line connected to the skew detecting circuit to supply the data signal or the delayed data signal;
a second signal line connected to the skew detecting circuit to supply first to $N^{th}$ clock signals;
a first switch provided in the first signal line; and
a second switch provided in the second signal line,
wherein the skew detecting circuit is configured to generate and output the control signal to control the delay time of the at least one signal to the variable delay circuit based on the skew detection data,
wherein the first switch and the second switch supply the data signal or the delayed data signal to the skew detecting circuit and the first to $N^{th}$ clock signals to the skew detecting circuit in a specific period which contains a period for which the specific data sequence is transmitted,
wherein the first switch and the second switch block off supply of the data signal or the delayed data signal to the skew detecting circuit and supply of the clock signal to the skew detecting circuit in a period except the specific period, and
wherein the skew detecting circuit holds a value of the control signal in the period except the specific period.

10. The receiver according to claim 1, further comprising:
a third receiving section configure to receive a second external data signal and output a second data signal;
a second variable delay circuit configured to generate a second delay-adjusted data signal and a second delay-adjusted clock signal by delaying at least one of the clock signal and the second data signal;
a second latch circuit section configured to latch the second delay-adjusted data signal in synchronization with the second delay-adjusted clock signal to generate a second output data signal; and
a second skew detecting circuit configured to generate a second skew detection data by latching the specific data sequence transmitted by the second data signal or the second delayed data signal obtained by delaying the second data signal, in synchronization with first to $N^{th}$ clock signals (N is an integer equal to or more than 2) with different delay times to the clock signal, and control the delay time of the at least one signal in the second variable delay circuit based on the second skew detection data.

11. A receiver comprising:
a first receiving section configured to receive an external clock signal and output a clock signal;
a second receiving section configured to receive an external data signal and output a data signal;
a variable delay circuit configured to generate a delay-adjusted clock signal and a delay-adjusted data signal by delaying at least one of the clock signal and the data signal;
a latch circuit section configured to latch the delay-adjusted data signal in synchronization with the delay-adjusted clock signal to generate an output data signal; and
a skew detecting circuit configured to generate skew detection data by latching a specific data sequence transmitted with first to $N^{th}$ data signals (N is an integer equal to or more than 2) with different delay times to the data signal in synchronization with the clock signal or a delayed clock signal obtained by delaying the clock signal, and control a delay time of the at least one of the clock signal and the data signal based on the skew detection data.

12. The receiver according to claim 11, wherein the skew detecting circuit generates a control signal to control the delay time of the at least one of the clock signal and the data signal by the variable delay circuit based on the skew detection data,
wherein the variable delay circuit generates the first to $N^{th}$ data signals and selects and outputs either of the first to $N^{th}$ data signals as the delay-adjusted data signal based on the control signal, and
wherein the first to $N^{th}$ data signals are supplied from the variable delay circuit to the skew detecting circuit.

13. The receiver according to claim 12, wherein the variable delay circuit generates the delayed clock signal by delaying the clock signal by a predetermined time, and generates the delay-adjusted clock signal from the delayed clock signal,
wherein the delayed clock signal is supplied from the variable delay circuit to the skew detecting circuit, and
wherein the skew detecting circuit generates the skew detection data by latching the specific data sequence transmitted with the first to $N^{th}$ data signals in synchronization with the delayed clock signal.

14. A transmission and reception system comprising:
a transmitter; and
a receiver configured to receive an external clock signal and an external data signal from the transmitter, and
wherein the receiver comprises:
a first receiving section configured to receive the external clock signal and output a clock signal;
a second receiving section configured to receive the external data signal and output a data signal;
a variable delay circuit configured to generate a delay-adjusted clock signal and a delay-adjusted data signal by delaying at least one of the clock signal and the data signal;
a latch circuit section configured to latch the delay-adjusted data signal in synchronization with the delay-adjusted clock signal to output an output data signal; and
a skew detecting circuit configured to latch a specific data sequence transmitted with the data signal or the delayed data signal obtained by delaying the data signal in synchronization with first to $N^{th}$ clock signals (N is an integer equal to or more than 2) with different delay times to the clock signal to generate skew detection data, and control the variable delay circuit to adjust a delay time of the at least one signal based on the skew detection data.

15. The transmission and reception system according to claim 14, wherein the transmission of the external clock signal and the external data signal from the transmitter to the receiver is carried out based on the MIPI (Mobile Industry Processor Interface) D-PHY standard, and the specific data sequence is a data sequence which is contained in the HY-SYNC code.

16. A transmission and reception system comprising:
a transmitter; and
a receiver configured to receive an external clock signal and an external data signal from the transmitter, and
wherein the receiver comprises:
   a first receiving section configured to receive an external clock signal and output a clock signal;
   a second receiving section configured to receive an external data signal and output a data signal;
   a variable delay circuit configured to generate a delay-adjusted clock signal and a delay-adjusted data signal by delaying at least one of the clock signal and the data signal;
   a latch circuit section configured to latch the delay-adjusted data signal in synchronization with the delay-adjusted clock signal to generate an output data signal; and
   a skew detecting circuit configured to generate skew detection data by latching a specific data sequence transmitted with first to $N^{th}$ data signals (N is an integer equal to or more than 2) with different delay times to the data signal generated from the data signal, in synchronization with the clock signal or a delayed clock signal obtained by delaying the clock signal, and control a delay time of the at least one signal based on the skew detection data.

17. The transmission and reception system according to claim 16, wherein the transmission of the external clock signal and the external data signal from the transmitter to the receiver is carried out based on the MIPI (Mobile Industry Processor Interface) D-PHY standard, and the specific data sequence is a data sequence which is contained in the HY-SYNC code.

* * * * *